United States Patent
Nelson et al.

(10) Patent No.: US 6,813,820 B2
(45) Date of Patent: Nov. 9, 2004

(54) METHOD OF IMPROVING COATING UNIFORMITY

(75) Inventors: James M. Nelson, Lino Lakes, MN (US); Raghunath Padiyath, Woodbury, MN (US); Robert B. Secor, Stillwater, MN (US); Mark J. Stevenson, Forest Lake, MN (US); Michael J. Tichy, Staples, MN (US); Robert A. Yapel, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 398 days.

(21) Appl. No.: 10/027,763

(22) Filed: Dec. 19, 2001

(65) Prior Publication Data

US 2003/0116881 A1 Jun. 26, 2003

(51) Int. Cl.[7] .......................... B23P 25/00; B29C 47/16
(52) U.S. Cl. .............. 29/527.4; 264/177.1; 264/177.16; 264/400; 425/135; 425/466; 118/406; 118/410; 219/121.67; 219/121.69; 29/525.11
(58) Field of Search ........................... 264/176.1, 177.1, 264/177.16, 349, 400; 219/121.67, 121.69; 425/135, 466, 406, 410; 29/428, 464, 525.11, 527.2, 527.4; 118/406, 410

(56) References Cited

U.S. PATENT DOCUMENTS

| | | | |
|---|---|---|---|
| 2,367,839 A | 1/1945 | Grover | |
| 3,241,183 A | 3/1966 | Tyrner | |

(List continued on next page.)

FOREIGN PATENT DOCUMENTS

| | | |
|---|---|---|
| DE | 3019460 A | 11/1981 |
| JP | 7008879 | 1/1995 |
| JP | 7195015 | 8/1995 |
| JP | 7195016 | 8/1995 |
| JP | 7308620 | 11/1995 |
| JP | 8103711 | 4/1996 |
| JP | 9253555 | 9/1997 |
| JP | 11276965 | 10/1999 |
| JP | 2000084457 | 3/2000 |
| JP | 2000176343 | 6/2000 |
| JP | 2000271522 | 10/2000 |
| WO | WO 95/29763 | 11/1995 |
| WO | WO 95/29764 | 11/1995 |
| WO | WO 95/29765 | 11/1995 |
| WO | WO95/29766 | 11/1995 |
| WO | WO 00/06364 | 2/2000 |

OTHER PUBLICATIONS

Catalog, Precision Steel Warehouse, Inc. 1998, Franklin Park, IL (3 pages).

Edward Cohen and Edgar Gutoff, "Modern Coating and Drying Technology", VCH Publishers, NY 1992, ISBN 3–527–28246–7.

Gutkoff and Cohn, "Coating and Drying Defects: Troubleshooting Operating Problems", Wiley Interscience, NY, ISBN 0–471–59810–0.

(List continued on next page.)

Primary Examiner—Stefan Stancovici
(74) Attorney, Agent, or Firm—Rick L. Franzen; Brian E. Szymanski

(57) ABSTRACT

The invention is a method of forming extrudate having substantially uniform thickness. A shim is formed which has a thickness variation of less than or equal to about 0.5 mil (13 microns) total indicated runout. This shim is disposed between a first die portion having a first surface and a second die portion having a second surface. A slot is formed between the first surface and the second surface. The slot has a height dimension substantially the same as the shim thickness. Flowable material is extruded through the slot.

15 Claims, 15 Drawing Sheets

U.S. PATENT DOCUMENTS

| | | |
|---|---|---|
| 3,289,632 A | 12/1966 | Barstow |
| 3,292,211 A * | 12/1966 | Strange ..................... 425/135 |
| 4,142,010 A | 2/1979 | Pipkin et al. |
| 4,221,184 A | 9/1980 | Gref et al. |
| 5,500,274 A | 3/1996 | Francis et al. |
| 5,587,184 A | 12/1996 | Leonard et al. |
| 5,607,726 A | 3/1997 | Flattery et al. |
| 5,612,092 A | 3/1997 | Strenger et al. |
| 5,639,305 A | 6/1997 | Brown et al. |
| 5,655,948 A | 8/1997 | Yapel et al. |
| 5,702,527 A | 12/1997 | Seaver et al. |
| 5,741,549 A | 4/1998 | Maier et al. |
| 5,750,159 A | 5/1998 | Delmore et al. |
| 5,759,274 A | 6/1998 | Maier et al. |
| 5,780,109 A | 7/1998 | Yapel et al. |
| 5,837,324 A | 11/1998 | Yapel et al. |
| 5,843,530 A | 12/1998 | Jerry et al. |
| 5,851,137 A | 12/1998 | Bhave et al. |
| 5,871,585 A | 2/1999 | Most et al. |
| 5,894,994 A * | 4/1999 | Keane et al. ............... 239/134 |
| 5,980,992 A | 11/1999 | Kistner et al. |
| 5,998,549 A | 12/1999 | Milbourn et al. |
| 6,290,837 B1 | 9/2001 | Iwata et al. |
| 6,319,316 B1 * | 11/2001 | Gibson et al. ................ 118/50 |
| 6,548,115 B1 * | 4/2003 | Gibson et al. .............. 427/282 |

OTHER PUBLICATIONS

Bird, Armstrong, and Hassager, *Dyamics of Polymeric Liquids*, vol. 1, Wiley & Sons, NY, 1987 ISBN 0–471–80245–S, Chapter 4, pp. 169–175.

Robert Secor, "Analysis and Design of Internal Coating Die Cavaties", Stephan Kistler and Peter Schweizer, Liquid Film Coating, Chapman & Hall, UK, 1997, ISBN 0–412–06481–2.

Research Disclosure, "Die Shims for Modified Film Thickness Profile", May, 1996.

* cited by examiner

METHOD OF IMPROVING COATING UNIFORMITY

BACKGROUND OF THE INVENTION

The present invention relates to a method for forming an extrudate such as by applying a coating on a substrate. In particular, the invention applies to a method of preparing a die to improve the uniformity of the extrudate.

The production of high quality articles, particularly electronic, tape, optical, photographic, photothermographic, thermographic, abrasives, adhesive, display, and pharmaceutical articles, consists of applying a thin film of a coating solution onto a continuously moving substrate or web. Thin films can be applied using a variety of techniques, including dip coating, forward and reverse roll coating, wire wound rod coating, and die type coating. Die coaters include knife coaters, slot coaters, slide coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY, ISBN 0-471-59810-0.

Die coating is a process whereby a pressurized stream of coating material is moved through an internal manifold of a die coater and discharged from an exit slot to form a ribbon of coating material. The uniformity of the coating layer depends on the precision of the coating slot of the coating dies through which the coating layer (or extrudate) passes. Coatings can be applied as a single layer or as two or more superimposed layers. Although it is usually most convenient for the substrate to be in the form of a continuous web, it may also be formed to a succession of discrete sheets. In the manufacturing of coated products, it is generally desirable to attain a uniform coating thickness having the smallest possible variation in the coating thickness. This is especially true for products for critical optical or electronic applications.

All die coaters have at least one slot. Each slot has a slot width corresponding to the coated width, a slot length corresponding to the distance from the manifold cavity to the exit of the slot, and a slot height, which is the narrow dimension of the slot between the two parallel surfaces defining the slot itself. One of the fundamental problems associated with die type coaters is the ability to accomplish a uniform flow per unit width across the entire width of the slot of the die. A fundamental issue in attaining this uniformity of the flow, and thus the critical uniformity of the coated product, is the ability to construct a die with the best possible precision of the die slot "height" (e.g., a uniform die slot "height" across the entire width of the slot).

In an attempt to improve coating uniformity, various manual, mechanical, thermomechanical, piezomechanical, magnetostrictive, and motor driven actuators have been installed on coating dies to control the die slot. The actuators can be located to generate an individual displacement force locally across the width of the slot exit. Since at any point across the die width the local discharge rate from the slot exit depends on the local gap, the uniformity of the flow rate from the die can be controlled across the width. U.S. Pat. No. 5,587,184 discloses a coating die with a slot thickness control mechanism located away from the slot exit.

Control of the die slot is typically accomplished by measuring the thickness of the film or coating at various points across its width with a thickness gauge such as a beta-ray, x-ray, or light absorption gauge. With the information from such measurements, an operator can manually adjust a bolt-type actuator bearing against the coating die. Alternatively, a control system can signal the activation of actuators which bear against the coating die or which rotate bolts that bear against the coating die. The manual adjustment of the coating die flexing bolts by an operator requires skill and experience. It has been shown that the quality of the product extruded or coated can be improved by a closed loop control system to replace the manual operator adjustment.

The die slot is typically not set for optimum uniformity when initially assembled. The adjustment cycle is time consuming and typically results in significant waste of coating material and substrate. Moreover, the actuators are not truly independent, but interact. That is, an adjustment of one actuator can require an adjustment of adjacent actuators. Consequently, the cross machine direction (crossweb) mechanical resolution, coupled with the limitations discussed above, results in inadequate accuracy of the die slot.

SUMMARY OF THE INVENTION

The invention is a method of forming extrudate having substantially uniform thickness. A shim is formed which has a thickness variation of less than or equal to about 0.5 mil (13 microns) total indicated runout. This shim is disposed between a first die portion having a first surface and a second die portion having a second surface. A slot is formed between the first surface and the second surface. The slot has a height dimension substantially the same as the shim thickness. Flowable material is extruded through the slot.

BRIEF DESCRIPTION OF THE DRAWINGS

In this disclosure, alternate embodiments of the invention are illustrated. Throughout the drawings, like reference numerals are used to indicate common features or components of those devices.

While the above-identified drawing figures set forth alternate embodiments of the apparatus used in the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION OF THE INVENTION

Figure 1:
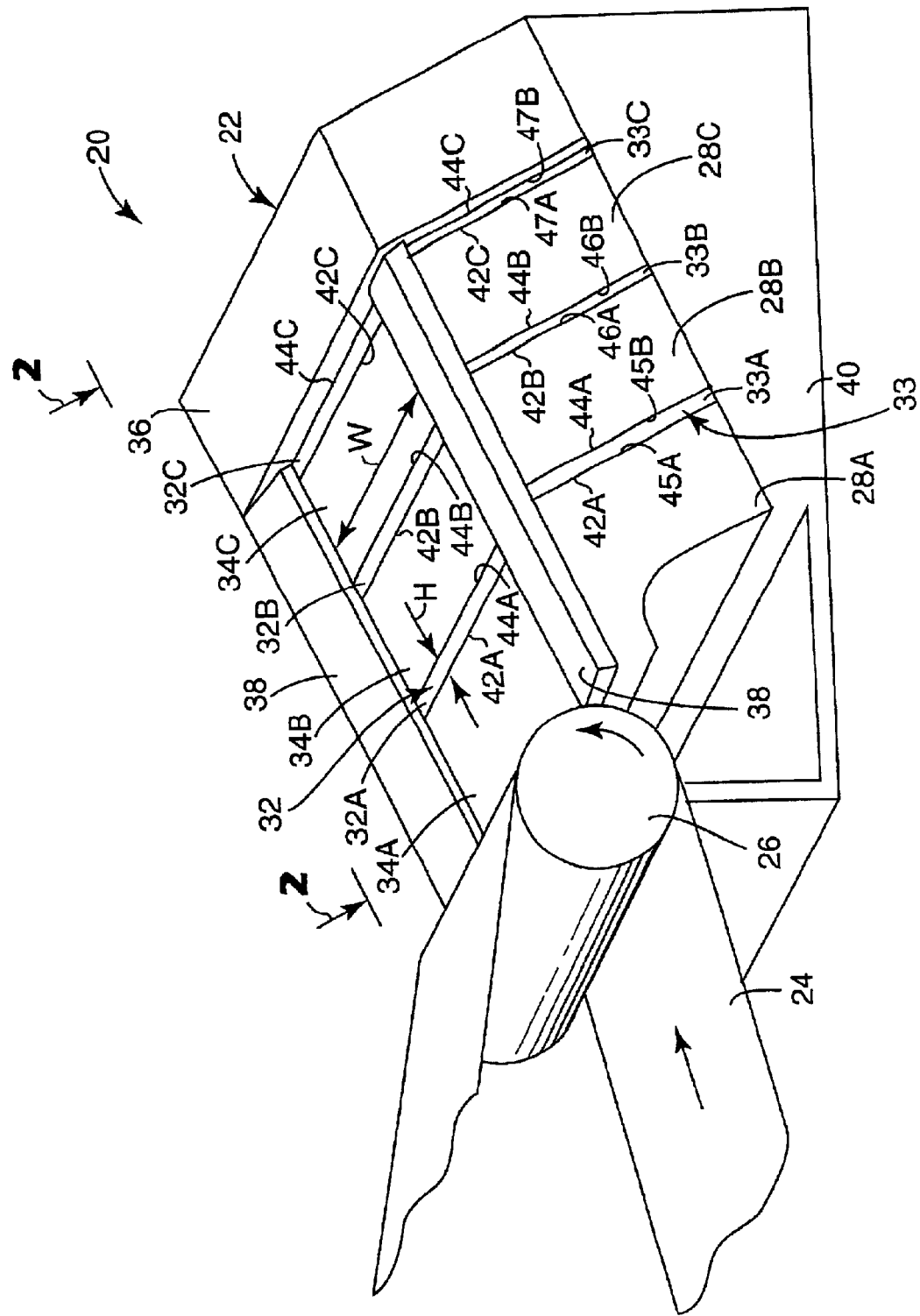
FIG. 1 is a perspective view of an exemplary coating die.
Figure 2:
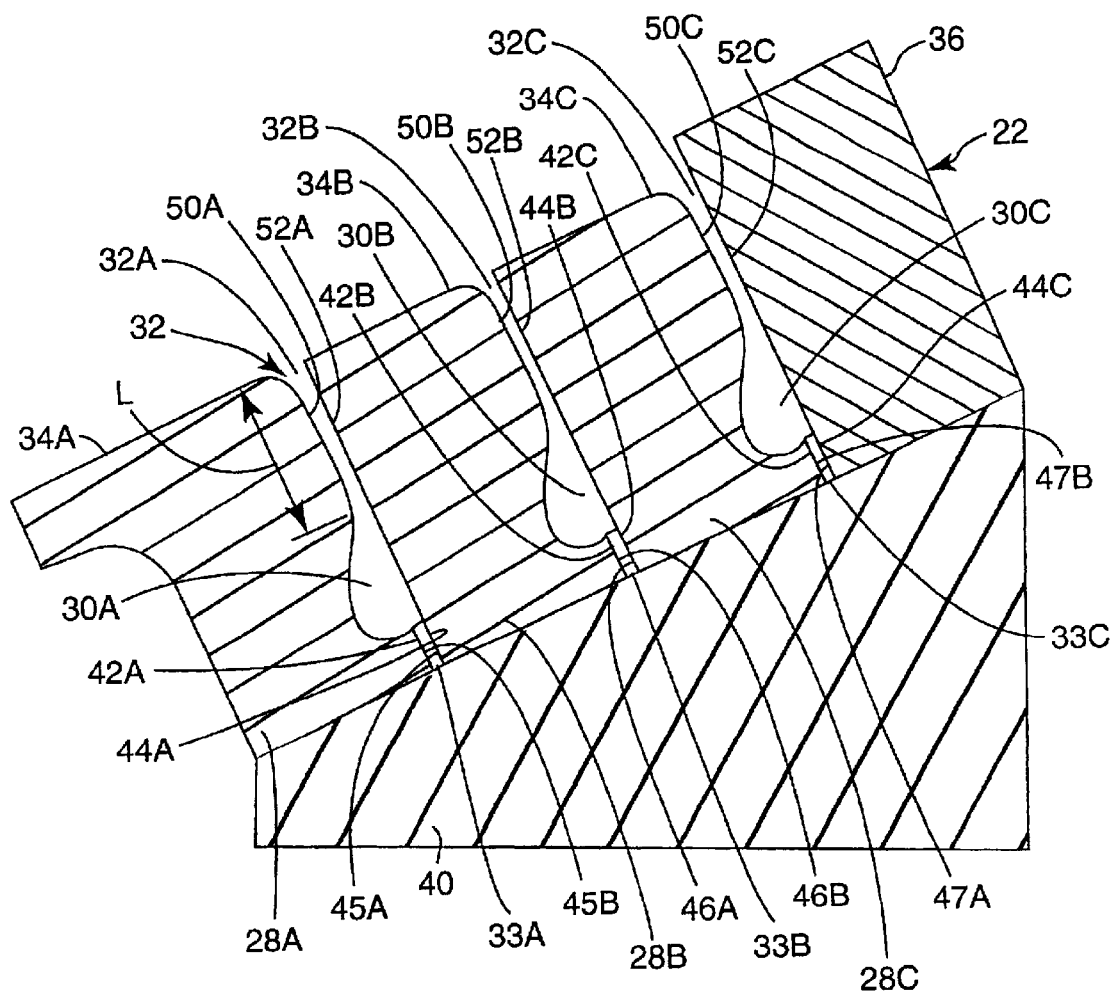
FIG. 2 is a cross-sectional view as taken along lines 2—2 in FIG. 1.

FIG. 1 and FIG. 2 illustrate one type of coating apparatus, in this embodiment a slide coater 20, made according to the method of the present invention. FIG. 1 is a perspective view of slide coater 20 and FIG. 2 is a cross-sectional view of slide coater 20 as taken along lines 2—2 of FIG. 1. Slide coater 20 includes die assembly 22 positioned opposite advancing web 24 that is supported by backup roll 26. Die assembly 22 is supported by base plate 40 and includes a series of die blocks 28A, 28B, 28C, each configured with manifold cavities 30A, 30B, 30C that is in communication with a series of die slots 32A, 32B, 32C, respectively. A series of shims 33A, 33B, and 33C are disposed between the individual die blocks 28A, 28B, and 28C. Coating material supplied to manifold cavities 30A, 30B, and 30C is extruded from the slots 32A, 32B, 32C and slides down the slide surfaces 34A, 34B, 34C to be coated onto the advancing web 24.

As mentioned each, die slot 32 is formed by a shim 33. By disposing individual shims 33 between portions of the die assembly 22 (in this embodiment, die blocks 28A, 28B and 28C), a space is maintained between these portions, resulting in die slots 32A, 32B and 32C. Slot height "H" (see FIG. 1) is the narrow dimension of each slot 32. Shims 33 provide flexibility to the die assembly 22, since increasing or decreasing the height of the slot can be accomplished by replacing individual shims 33 with ones that are thicker or thinner, respectively. It should be noted that throughout the application, elements may be referred to generally using a reference number (e.g. shims 33) and referred to particularly using a reference number with a letter appended (e.g. shim 33A, 33B, and 33C).

Surface 42A on the die block 28A and surface 44A on the die block 28B engage first and second surfaces 45A and 45B on shim 33A. Slot 32A is found between the two parallel surfaces 50A and 52A. This dimension (while capable of being any distance) is typically much smaller with respect to the slide coater 20 size than has been illustrated for exemplary purposes. The slot length "L" (see FIG. 2) corresponds to the distance from each manifold (for example manifold cavity 30A) to each slide surface (for example slide surface 34A). The slot width "W" (see FIG. 1) corresponds to the coated layer (or extrudate) width. In the current embodiment, the coated width is determined by edge guides 38. Alignment surface 42A on die block 28A is configured to engage with corresponding first surface 45A of shim 33A. Surface 44A is configured to engage with corresponding second surface 45B of shim 33A. Surfaces 42A, 45A, 45B, and 44A are preferably parallel so that the slot 32A has a uniform height "H" with respect to surfaces 50A and 52A.

Die slots 32B and 32C are formed in a similar fashion. Die slot 32B is formed by surface 42B on die block 28B and surface 44B on die block 28C engaging first and second surfaces 46A and 46B on shim 33B. Slot height "H" is defined by the gap between the two parallel surfaces 50B and 52B. Slot length "L" corresponds to the distance from manifold cavity 30B to slide surface 34B. Slot width "W" is determined by edge guides 38. Alignment surface 42B on die block 28B is configured to engage with a corresponding first surface 46A on shim 33B. Alignment surface 44B on die block 28C is configured to engage with corresponding second surface 46B on shim 33B. Surfaces 42B, 46A, 46B, and 44B are preferably parallel so that the slot 32B has a uniform height "H" with respect to surfaces 50B and 52B.

Die slot 32C is formed by surface 42C on the die block 28C and surface 44C on upstream block 36 engaging first and second surfaces 47A and 47B on shim 33C. Slot height "H" is defined by the gap between the two parallel surfaces 50C and 52C. Slot length "L" corresponds to the distance from the manifold cavity 30C to slide surface 34C. Slot width "W" is determined by edge guides 38. Alignment surface 42C on die block 28C is configured to engage with a corresponding first surface 47A on shim 33C. Alignment surface 44C on the upstream block 36 is configured to engage with a corresponding second surface 47B on shim 33C. Surfaces 42C, 47A, 47B, and 44C are preferably parallel so that the slot 32C has a uniform height "H" with respect to the surface 50C and 52C.

While three slots are illustrated, it should be noted that this is for exemplary purposes only. Any number of die slots (with corresponding shims) can be used without departing from the scope of the invention.

As discussed, a fundamental problem with all die assemblies, such as die assembly 22, is the ability to accomplish a uniform flow of material through each slot 32 per unit area across the width "W" of the die assembly 22. An important criteria for attaining uniformity of flow, and thus a critical uniformity of the coating, is the ability to construct the slots 32A, 32B, and 32C so as to have a precisely uniform die slot height "H". As discussed in PCT publication WO 00/06364, forming the aligning surfaces 42A, 42B, 42C, 44A, 44B and 44C and slot surfaces 50A, 52A, 50B, 52B, 50C and 52C on the die blocks 28A, 28B, and 28C (such as by grinding) to a low total indicated runout can increase the precision of the slot height.

Figure 3:
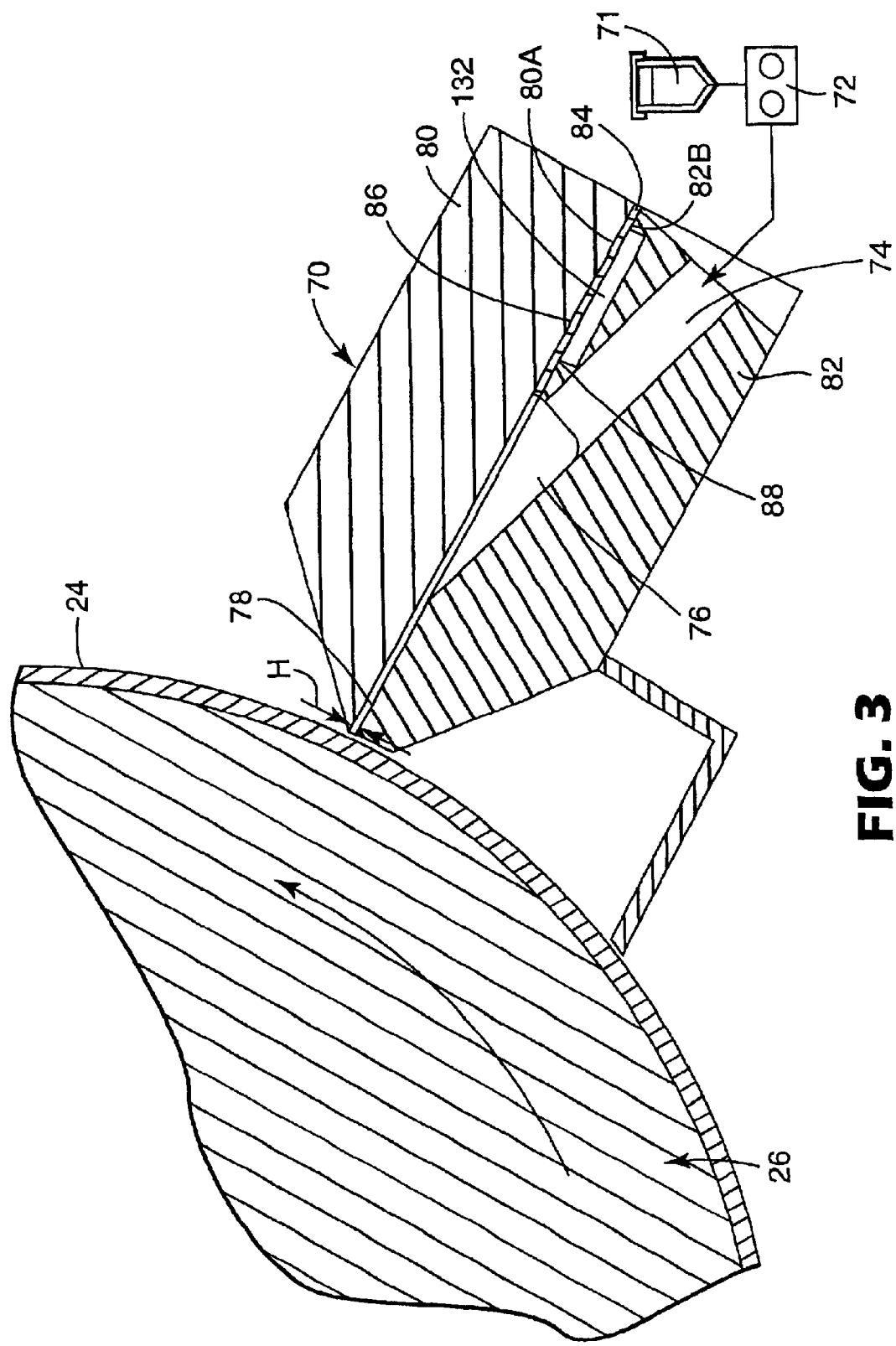
FIG. 3 is a cross-sectional view of an alternate exemplary coating die.

An alternate style of die utilizing a shim is illustrated by extrusion coating die 70 in FIG. 3. This type of die is further discussed in PCT Publication WO 95/29764. Coating liquid 71 is supplied by a pump 72 to the die 70 for application to moving web 24, supported by a backup roll 26. Coating liquid is supplied through a channel 74 to a manifold cavity 76 for distribution through a slot 78 and coated (or extruded as extrudate) onto the moving web 24. The coating liquid 71 can be one of numerous liquids or other fluids. Die 70 is divided into top portion 80 and a bottom portion 82. The height "H" of the slot 78 can be controlled by inserting a C-shaped shim 84 between the top portion 80 and the bottom portion 82 of the die 70. The shim 84 (as well as shims 33, discussed with respect to FIG. 1) can be made of plastic, plated nickel sheet material, brass, stainless steel, or magnetic stainless steel. Typically, any machineable metal may be used for the shims in the inventive method. A top surface 86 of shim 84 engages an aligning surface 80A of top portion 80 of die 70. A bottom surface 88 of shim 84 engages an aligning surface 82B of bottom portion 82 of shim 84. Fasteners (such as bolts) are typically used to secure the various portions of the extrusion die 70 (discussed and illustrated with respect to FIGS. 7–9) together.

Figure 4:
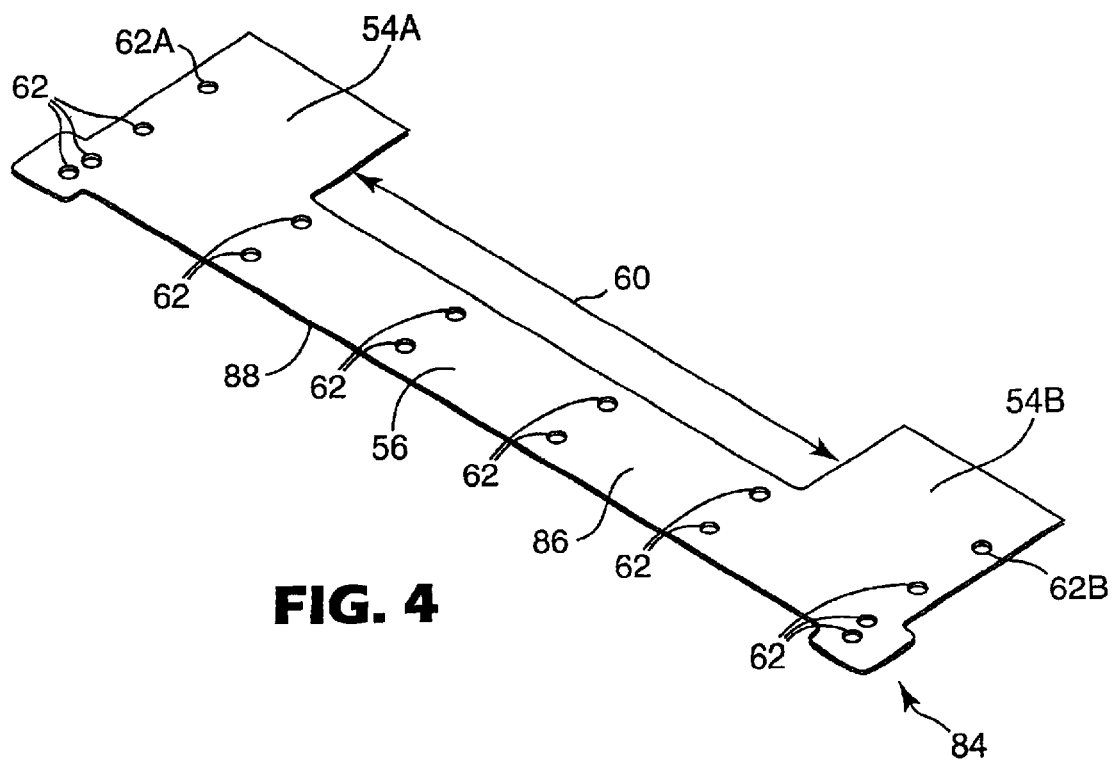
FIG. 4 is a perspective view of an exemplary shim utilized in a coating apparatus.

One typical shim used in the extrusion die 70 is illustrated in FIG. 4 at 84. End portions 54A and 54B of the shim 84 along with rear middle portion 56 are disposed so as to form the shim 84 into a "C" shape. The top surface 86 and the bottom surface 88 on shim 84 are used to engage aligning surfaces 80A and 82B of the top and bottom portions 80 and 82 of extrusion die 70 (similar to the discussion with respect to surfaces 45A and 45B of shim 33 in FIGS. 1 and 2). Gap 60 disposed between end portions 54A and 54B forms the width of extrusion slot 78. Fastener holes 62 indicate exemplary positions of fasteners (discussed with respect to FIGS. 7–9) which pass through shim 84 and hold together the extrusion die 70. First and second slot holes 62A and 62B, respectively, are disposed such that varying the torque on fasteners disposed through these holes can finely vary the height of either end of extrusion slot 78 (defined by gap 60).

While the above two apparatus embodiments are coating dies, it should be understood that utilizing the invention with other types of extrusion dies is contemplated as well. For example, using a thermoplastic film extrusion die, which does not utilize a substrate (or web) in the extrusion process, is also contemplated by the invention.

As was illustrated and discussed with respect to FIGS. 1–4, it is known to use shims to form the slot(s) of the die when sandwiched between two die halves for slot type coaters. The shim offers the flexibility to change the slot height by replacing a shim of one thickness with one of a second thickness. This change is often required depending on the coating requirements for a particular application such as flow rate, viscosity, coating performance, and flow uniformity distribution. Also, shims allow changing of the coating width with a given die manifold set-up. Thus, instead of requiring use of a completely different die, the die can be modified using a different shim.

In constructing the die, the die portions themselves are ground to a high level of precision (as discussed in PCT publication WO 00/06364). In the inventive method the shims are precisely ground as well. Previously, shims such as those described for use with the coating dies illustrated in FIGS. 1–4 were cut from commercially available precision shim stock. The shims are usually made from materials like plastic, brass or stainless steel. The best tolerance specification for the commercially available stainless steel shim stock is typically about 0.001 inch (25.4 micron) for a 0.010 inch (254 micron) thick shim stock (or 10% variability). This means that using shims generally resulted in a larger total indicated runout (TIR) of each slot. This resulted in larger variation in slot uniformity, which translates into greater crossweb variation in the coating thickness. Another way to discuss the variability in the thickness of the slots and the shims is with variability. Variability is the TIR of measured article (e.g. slot or shim) divided by the average thickness of the article, times 100. The current invention reduces the variability of the shim thickness to about 5 percent or less, preferably about 2 percent or less, and most preferably about 1 percent or less. Consequently, the variability in the slot height can be reduced to about 5 percent or less, preferably about 2 percent or less, and most preferably to about 1 percent or less. Variability in height or thickness is In particular, this reduction in variability to shims less than about 30 mil (760 microns) significantly affects the resulting uniformity of flow of the extrudate.

The relationship between flow in the slots (such as 32A, 32B, 32C and 78 in the first two die embodiments) and the slot geometry for a power law fluid is given by the equation:

$$Q/W = \left(\frac{nH^2}{2(1+2n)}\right)\left(\frac{H\Delta P}{2KL}\right)^{1/n}$$

where Q/W is the flow per unit width, H is the slot height, ΔP is the pressure, differential between the entrance and exit of the slot, L is the slot length, K is the consistency index, and n is the power-law index. For Newtonian fluids n=1 and K=μ, the Newtonian viscosity. This relationship is discussed in Bird, Armstrong, and Hassager, *Dynamics of Polymeric Liquids,* Vol. 1, Wiley & Sons, NY, 1987 ISBN 0-471-80245-X (vol. 1).

In the die embodiments illustrated in FIGS. 1–4, the uniformity of the die slot height "H" of each die slot is dependent on the total indicated run-out (or "TIR") i.e. flatness of each of the aligning surfaces 42A, 44A, 42B, 44B, 42C, 44C, 80A, 82B. Additionally, the uniformity of the die slot height depends on the TIR of the thickness of shims 33 and 84. This is related to the TIR of shim surfaces 45A, 45B, 46A, 46B, 47A, 47B, 86 and 88.

The measurement of "TIR" is an indication of the tolerance, preciseness and flatness of the surfaces. TIR is equal to the maximum value of the article being measure minus the minimum value of the article being measured. While TIR is a measurement value typically used by machinists, this does not imply that the only method for obtaining the precise tolerances is by machining. To the contrary, other techniques can be used. The surface can be formed by methods such as grinding (discussed later), chemical etching, or sputtering (among others) to form a surface to as low a tolerance (or as great a preciseness) as possible.

In the current invention, increasing the preciseness of the shim surfaces (such as by grinding) increases the uniformity of flow (or in other words the cross-sectional uniformity in thickness of the extrudate) from each slot 32. To illustrate, if each of the slots has an indicated run-out of t, then the percent uniformity of flow from the slots 32A, 32B, 32C is equal to:

$$\% \text{ Uniformity} = \frac{(H+t/2)^{(2+1/n)} - (H-t/2)^{(2+1/n)}}{H^{(2+1/n)}}$$

where H and n are as defined above. Percent uniformity values are computed as (maximum flow−minimum flow)/average flow×100%. 0% corresponds to a perfectly uniform crossweb profile.

Figure 5:
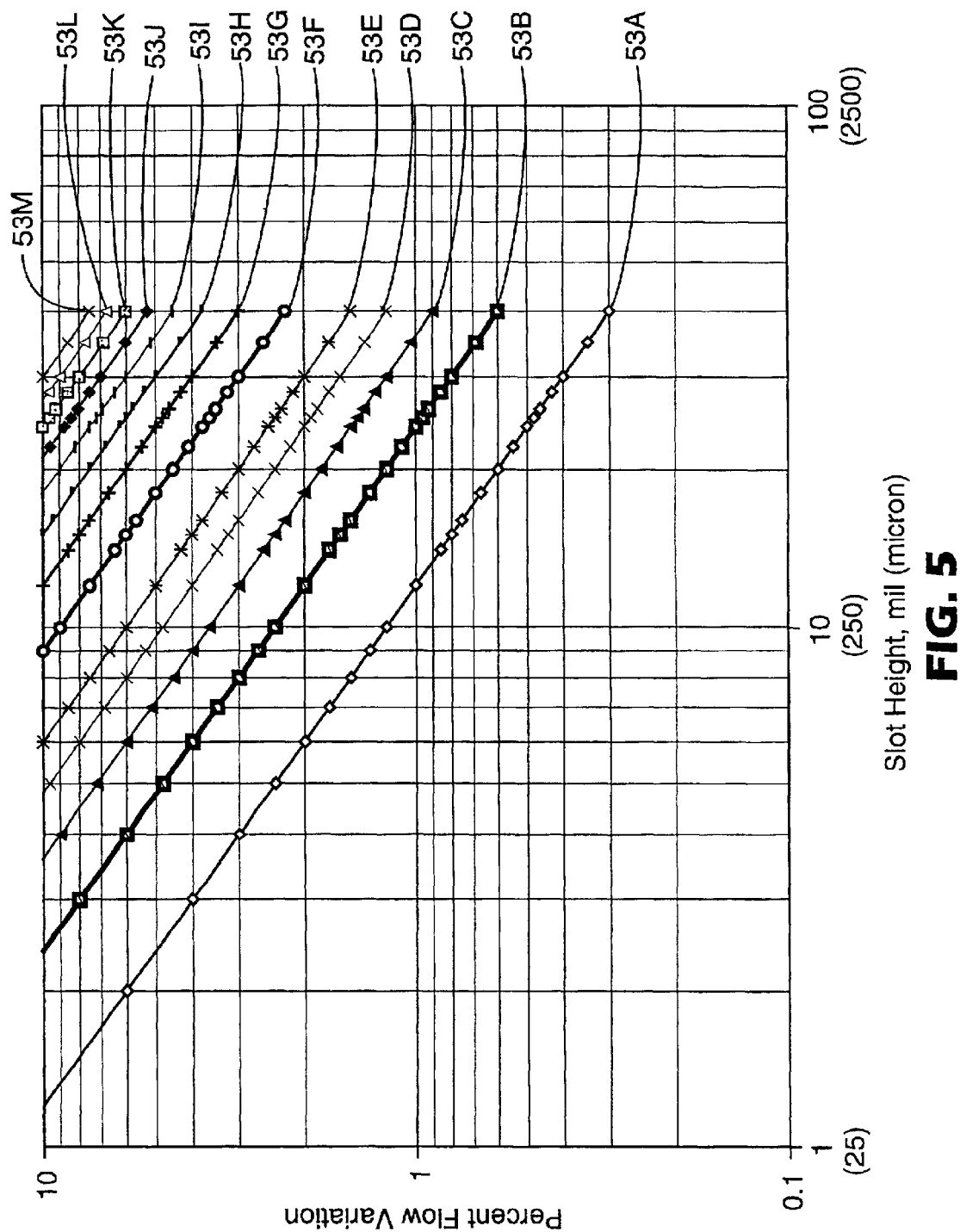
FIG. 5 is a graph illustrating the effect of total indicated runout of a slot on flow uniformity of extrudate exiting a slot.

FIG. 5 illustrates the influence of slot height variation and magnitude on flow uniformity for a Newtonian liquid using the formula above. The graph illustrates the crossweb profile (i.e., thickness variation) for material flowing through a slot having a TIR of:

1) about 40 microinches (1.0 microns) (reference number 53A)
2) about 80 microinches (2.0 microns) (reference number 53B)
3) about 120 microinches (3.0 microns) (reference number 53C)
4) about 160 microinches (4.1 microns) (reference number 53D)
5) about 200 microinches (5.1 microns) (reference number 53E)
6) about 300 microinches (7.6 microns) (reference number 53F)
7) about 400 microinches (10.2 microns) (reference number 53G)

8) about 500 microinches (12.7 microns) (reference number 53H)
9) about 600 microinches (15.2 microns) (reference number 53I)
10) about 700 microinches (17.8 microns) (reference number 53J)
11) about 800 microinches (20.3 microns) (reference number 53K)
12) about 900 microinches (22.9 microns) (reference number 53L)
13) about and 1000 microinches (25.4 microns) (reference number 53M)

As illustrated, as the slot height decreases, the flow variation increases dramatically. Decreasing the TIR of the surfaces forming the slot has the effect of markedly reducing the percent variation in flow of the material through the slot. Thus it is clear that uniformity of the slot height has a profound impact on the coating crossweb uniformity.

Since the TIR of the shim thickness (e.g. surfaces 45A, 45B, 46A, 46B, 47A, 47B, 86 and 88) directly affects the TIR of the slot, improving the shim to tolerances lower than the commercially available shim stock reduces variations in uniformity of flow through dies having slots, while still providing flexibility of the die design. Thus, uniformity limitations which occur when using conventional shims in coater dies are overcome.

Figure 5A:
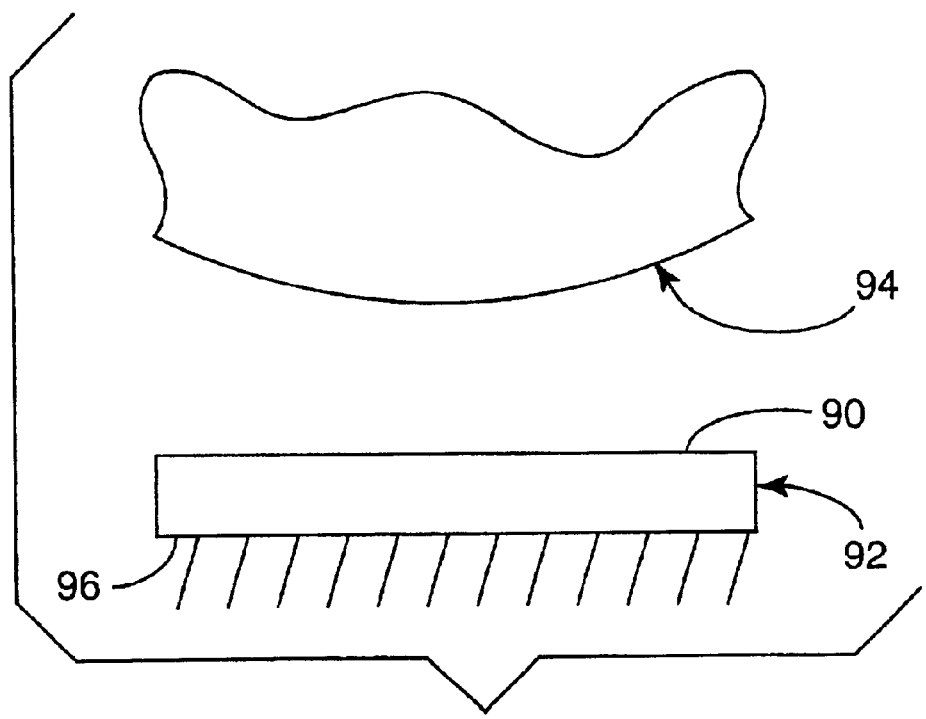
FIG. 5A is a schematic of the inventive grinding process with a flat shim

In order to create this improved tolerance shim, conventional metal shim stock, typically stainless steel, is chosen (although any of the materials mentioned previously may be used). This material is of a greater thickness gauge than the ultimate desired thickness. As illustrated in FIG. 5A, a first side (or first surface) 90 of shim material 92 is ground using a grinder 94. The grinder 94 is preferably a precision grinder which would allow grinding the shim material 92 to a preciseness of 5% variability. Most preferably, the grinder is capable of less than about 80 microinch (2 microns) runout over an 80 inch (2 meter) part length. Examples of grinder manufacturers, which may be used for the inventive method, include Cranfield Precision, a division of Unova UK, Cranfield, England, Elb-Schliff, GmbH, Babenhausen, Germany, Okamoto Machine Tool Works, Ltd., Atsugi, Japan and Waldrich-Coberg GmbH, Coberg, Germany. Other precision grinder manufacturers not specifically identified may also be used. The better the flatness and parallelism capability of the grinder 94, the lower the variation (or TIR) on the resultant shim. Once the first side 90 has been treated, the shim material 92 is flipped over and the second side (or second surface) 96 is ground on the same precision grinder 94. Grinding and turning the shim material 92 can be repeated until the shim material 92 arrives at the desired thickness. The final shim (such as shim 84 illustrated in FIG. 4) is then laser cut from the ground shim material 92. Alternatively, the shim may be cut from the shim material prior to grinding.

The result is a shim thickness variation of less than or equal to about 0.5 mil (13 microns) TIR or 5% variability for a 10 mil (250 micron) shim. When the aligning surfaces 80A and 82B of the top die portion 80 and bottom die portion 82 are ground using the precision grinder as discussed in PCT WO 00/06364, the final result is a TIR of 4 microns or less for slot 78.

Figure 5B:
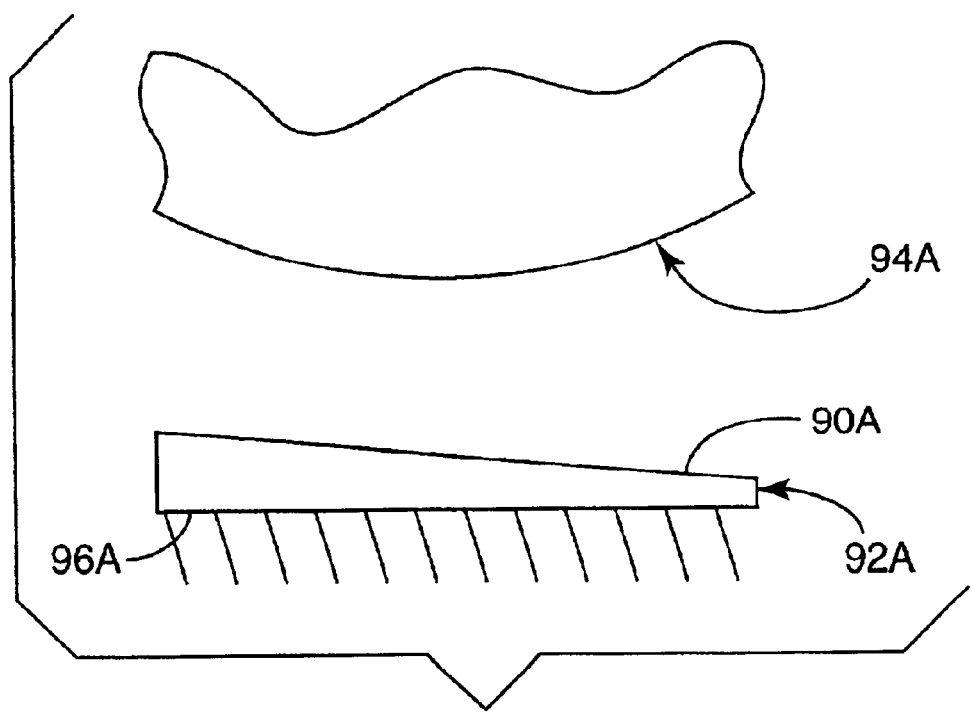
FIG. 5B is a schematic of the inventive grinding process with a profiled shim.

While one embodiment utilizes the precision type grinder to make the shim material 92 substantially the same thickness within a minimal tolerance, an alternate embodiment of the inventive method can utilize a precision crown grinder 94A (such as the Waldrich-Coberg model 0-15 SNC-Q 2020×2500 mm grinder) to form the shim 92A such that it has a profiled cross-section (i.e. varying in thickness), as illustrated in FIG. 5B. Profiled shims 92A expand the flexibility of a particular manifold design by manipulation of the height of the manifold slot 78.

The end process application may dictate that while the tolerance of the slot of the die be precise (as previously described), the slot may need to vary in height. Thus, the shim may need to vary in cross-section. For example, the extrusion die illustrated in FIG. 3 can be distinguished into two main types of designs: A T-manifold (also referred to as an 'infinite cavity' manifold) and the coathanger manifold. Both types are described in literature such as Robert Secor, "Analysis and Design of Internal Coating Die Cavities" in Stephan Kistler and Peter Schweizer, Liquid Film Coating, Chapman & Hall, UK, 1997, ISBN 0-412-06481-2. In the T-manifold design, the manifold cavity 76 has a constant cross-section and the slot 78 has a constant length across the width of the manifold cavity 76.

In the center-fed T-manifold design (known and described in the Secor reference), the pressure drop of the coating liquid laterally in the manifold cavity 76 is designed to be very small compared to the pressure drop of the coating liquid over the length of the slot 78 from the manifold cavity 76 to the exit of the die slot 78. If the manifold pressure drop is too high (due to too high a flow rate, too small a cavity, or the solution rheology), a crossweb "frown" profile in the coating thickness along the width of the coating layer (with higher thickness in the middle than the edges) typically occurs. If the manifold cavity 76 is an end-fed T-manifold design (as known and described in the Secor reference) and the lateral pressure drop in the manifold cavity 76 is too high relative to the slot pressure drop, then a coating profile with higher thickness corresponding to the feed side of the die occurs. The profiled shim 92A can be used to alter the shape of the die slot 78 to counter this profile and produce extrudate, which is uniform in the crossweb direction. While FIG. 5B shows profiled shim 92A having one particular profile (increasing in thickness along the width dimension of the shim 92A), it should be understood that any profile may be utilized according to the end application. For example, the thickness profile may vary such that the profiled shim 92A is incrementally thicker approaching the middle of the width dimension of the shim 92A, incrementally thinner approaching the middle of the width dimension of the shim 92A, or incrementally increasing in thickness along the width dimension of the shim 92A, among others.

Similarly, in a coathanger manifold design, the size of the manifold cavity 76 cross-section and the length of the slot 78 decreases with increasing distance from the feed location of the manifold cavity 76. The fundamental issues in attaining the uniformity of the flow (and thus the critical uniformity of the coated product) include the ability to tailor the geometry of the manifold cavity 76 and slot 78 to the coating liquid properties and coating processing conditions as well as the ability to construct a die that maintains the geometry of the manifold cavity 76 as close as possible to that of the intended design.

In the design of coathanger manifolds in extrusion dies, a particular manifold design will generally only distribute coating liquids with similar material properties uniformly over a small range of throughput rates. This is because the manifold is typically designed to achieve the best crossweb uniformity, taking into account a specific flow rate and the material properties of one specific liquid or a small numbers of liquids. The use of liquids with material properties different from that for which the manifold was designed will generally result in a less uniform crossweb distribution.

Likewise, changing the flowrate of the coating liquid through the die manifold will generally degrade the flow uniformity (although the uniformity is generally less sensitive to flowrate changes than it is to material property variations). As a result, the manifold design process is one of selecting appropriate compromises so that the required uniformity is obtained over the entire design window.

When a coathanger manifold is being designed for a wide range of conditions, it can be advantageous to fabricate a shim which has a pre-determined non-uniform thickness such as shim 92A illustrated in FIG. 5B. One example is a coathanger manifold design in an application, which requires obtaining reasonable uniformity for both the extrusion of two different materials while maintaining a relatively small liquid residence time in the manifold cavity.

The predicted crossweb uniformity for two exemplary liquids (or extrudates) are listed in Tables 1 and 2. These crossweb profile predictions are the results of calculations based on mass and momentum conservation principles as are described in literature such as Robert Secor, "Analysis and Design of Internal Coating Die Cavities" in Stephan Kistler and Peter Schweizer, Liquid Film Coating, Chapman & Hall, UK, 1997, ISBN 0-412-06481-2. The flow calculations are for an end-fed curvilinearly-tapered coathanger manifold (see FIG. 10.1(*d*) in the above reference) which is 8.5 inches (220 mm) wide.

The length of the slot (in inches) varies according to:

$$L(X) = \frac{1.00209 + 0.110545X - 0.00223457X^2}{1 + 0.123258X}, \quad 0 \le X \le 8.5,$$

where X is distance in the crossweb direction from the feed end of the manifold. The manifold cavity 76 has the cross-sectional shape shown in FIG. 3, but has a height dimension (in inches) which varies along with the width of the extrusion die 70 according to:

$$H(X) = 0.378057 - 0.169463\frac{(0.642X' - 0.531844X'^2 + 0.0658848X'^3)}{(1 - 1.09197X' + 0.268007X'^2)},$$

$$0 \le X' \equiv \frac{X}{8.5} \le 1.$$

The cavity cross-section has a 0.125 inch (3.12 mm) radius in the die bottom portion and a 15 degree angle between the die top and bottom portions adjacent to the slot entrance. The viscosity behavior of the two liquids is represented by the Bingham-Carreau-Yasuda model (equation 10.10 in the above cited reference) with the following parameter values:

|  | Material A | Material B |
|---|---|---|
| $\eta_0$ | 0.2902 psi-sec (2000 Pa-sec) | 0.0002374 psi-sec (1.636 Pa-sec) |
| n | 0.1132 | 0.2155 |
| λ | 384.6 sec | 0.230 sec |
| a | 8.471 | 6.311 |
| $\eta_\infty$ | 9.13 × 10$^{-6}$ psi-sec (0.0629 Pa-sec) | 0 |
| $\tau_Y$ | 0 | 0.000424 psi (2.923 Pa) |
| F | 10 | 10 |

The density of both liquids was taken to be 1.0 g/cc. The flow calculations assume the die is fabricated so that the manifold corresponds exactly according to the description above.

TABLE 1

Predicted uniformity for the extrusion of a material "A" with the use of a 10 mil (254 microns) non-profiled (i.e. flat or constant thickness) shim. The crossweb profile of the extrudate is low on the side of the slot closest to the feed (or input) to the manifold.

| Flowrate (gal/hr)(liters/hr) | % uniformity |
|---|---|
| 1.0 (3.8) | 5.22478 |
| 1.5 (5.7) | 7.61043 |
| 2.0 (7.6) | 8.90507 |
| 2.5 (9.5) | 9.72098 |
| 3.0 (11.4) | 10.2842 |

TABLE 2

Predicted uniformity for the extrusion of a material "B" with the use of a 10 mil (254 micron) non-profiled shim. The crossweb profile of the extrudate is high on the side of the slot closest to the feed side of the manifold.

| Flowrate (gal/hr)(liters/hr) | % uniformity |
|---|---|
| 1.0 (3.8) | 14.6242 |
| 1.5 (5.7) | 15.9154 |
| 2.0 (7.6) | 15.7397 |
| 2.5 (9.5) | 15.2414 |
| 3.0 (11.4) | 14.6825 |

Thus, the same shim in the same die causes a different profile for two different materials.

Better uniformity can be obtained with this manifold if we use a different shim thickness (although still a uniform thickness) for the two materials. As illustrated in Tables 3 and 4 below, a thicker shim for the first material raises the feed side of the profile while a thinner shim for the second material lowers the feed side for that material.

TABLE 3

Predicted uniformity for material "A" with use of a 11 mil (280 microns) shim. The crossweb profile is low on the feed side.

| Flowrate (gal/hr)(liters/hr) | % uniformity |
|---|---|
| 1.0 (3.8) | 1.09141 |
| 1.5 (5.7) | 4.43701 |
| 2.0 (7.6) | 6.3384 |
| 2.5 (9.5) | 7.55157 |
| 3.0 (11.4) | 8.3953 |

TABLE 4

Predicted uniformity for material "B" with the use of a 8.5 mu (216 micron) shim.

| Flowrate (gal/hr)(liters/hr) | % uniformity |
|---|---|
| 1.0 (3.8) | 1.59459 |
| 1.5 (5.7) | 0.75431 |
| 2.0 (7.6) | 1.14962 |
| 2.5 (9.5) | 1.59667 |
| 3.0 (11.4) | 2.04409 |

However, there are limits to the extent that the crossweb profile can be changed by only changing the thickness of the shim. In addition, changing the shim thickness may adversely affect other aspects of the coating performance such as the stability of the coating bead in an extrusion-type slot die application. As a result, a better tool to improve the crossweb uniformity for different materials or different process conditions is to profile the shim thickness in a pre-determined, non-uniform manner. Tables 5 and 6 show examples of improving the uniformity of the extruded materials "A" and "B" while maintaining the shim thickness closer to the original thickness of about 10 mils (254 micron).

TABLE 5

Predicted uniformity for material "A" with the use of a shim that varies linearly in thickness from about 10 mils (254 micron) on the feed side to about 9.8 mils (249 micron) on the distal side.

| Flowrate (gal/hr)(liters/hr) | % uniformity |
| --- | --- |
| 1.0 (3.8) | 1.92505 |
| 1.5 (5.7) | 0.873492 |
| 2.0 (7.6) | 2.26608 |
| 2.5 (9.5) | 3.1737 |
| 3.0 (11.4) | 3.80458 |

TABLE 6

Predicted uniformity for the material "B" with the use of a shim that varies linearly in thickness from 10 mils (254 micron) on the feed side to 10.25 (260.35 micron) mils on the distal side.

| flowrate (gal/hr)(liters/hr) | % uniformity |
| --- | --- |
| 1.0 (3.8) | 0.631963 |
| 1.5 (5.7) | 2.1629 |
| 2.0 (7.6) | 2.33164 |
| 2.5 (9.5) | 2.26532 |
| 3.0 (11.4) | 2.25164 |

The inventive grinding process can also be used to create profiled shims (as illustrated by shim 92A in FIG. 5B). The grinding process described above can be utilized to create the profiled shim 92A, with the use of a grinder with crown grinding capability (i.e., a "crown grinder"). The "profile" is created by varying the thickness of the shim. The shim is ground to a shim thickness profile determined based on calculations of the manifold flow or other techniques. Preferably, the precision grinder has the ability to grind a crown or reverse crown profile with a thickness variation in the range of about 0.0 mils (0.0 microns) to about 6 mils (152 microns).

Thus, the useful operating range of a coating die manifold can be efficiently expanded by utilizing the profiled shim 92A. Maintaining precision tolerances in the shim further enhances crossweb thickness uniformity. In one application, a relatively small coathanger-style manifold is required to prevent agglomeration of the coating material in the distal end of the manifold slot (i.e. the end of the slot farthest from the input to the manifold). However, manifold designs of this type tend to be rather specific to a small set of material properties or process conditions. That is, the manifold may extrude one extrudate well but will distribute a different liquid to a lesser degree. Or, the manifold may extrude an extrudate well at one particular throughput rate and distribute the same extrudate poorly at a different throughput rate. As a result, prior to this invention it was required to fabricate multiple dies in order to distribute a variety of coating liquids with a good degree of uniformity. The profiled shim capability described here allows a single die manifold to distribute a variety of coating liquids at a variety of process conditions through the use of profiled shims tailored to each particular coating liquid or process condition or set of coating liquids and process conditions. Varying the shim profile can compensate for variations of extrudate material (i.e., coating liquid) due to fluid rheology, flow rates of the material through the die, shape of the manifold cavity in the die as well as slot design and operating conditions of the die.

To grind shims this precisely (whether they are flat or profiled, as discussed with respect to FIGS. 5A and 5B) may require special tooling and techniques. Most surface grinders hold the work piece in place with an electromagnetic chuck, and sometimes by bolting or clamping a part in place. Neither of these are feasible approaches for a shim material, as utilized in the current invention, due to the thickness of the shim often being less than about 20 mils (500 microns). At this thickness, the electromagnet cannot provide sufficient hold-down force, and bolting or clamping can buckle the shim material.

Figure 6:
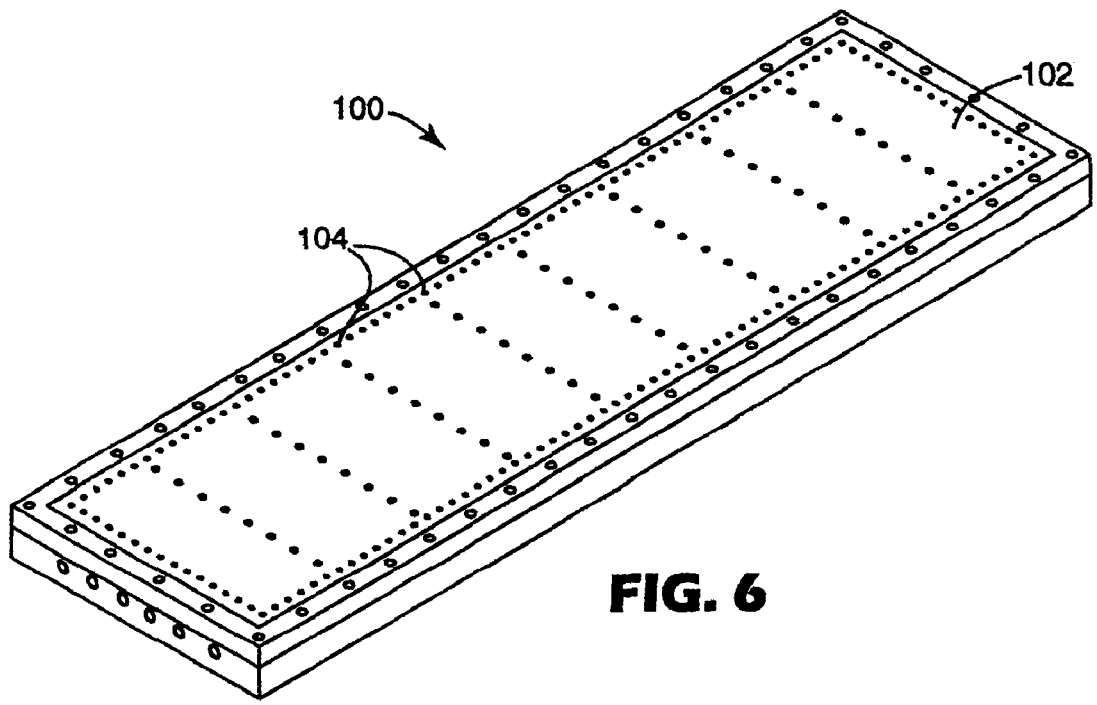
FIG. 6 is a perspective view of a vacuum fixture.
Figure 6B:
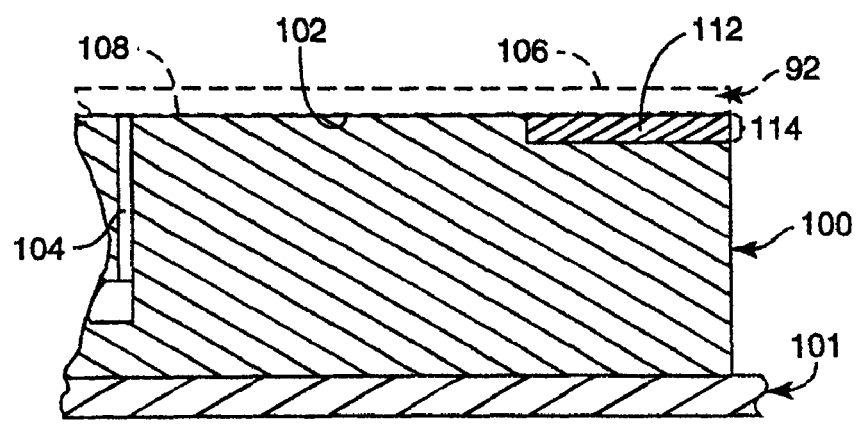
FIG. 6B is a partial cross-section of a vacuum fixture.
Figure 6A:
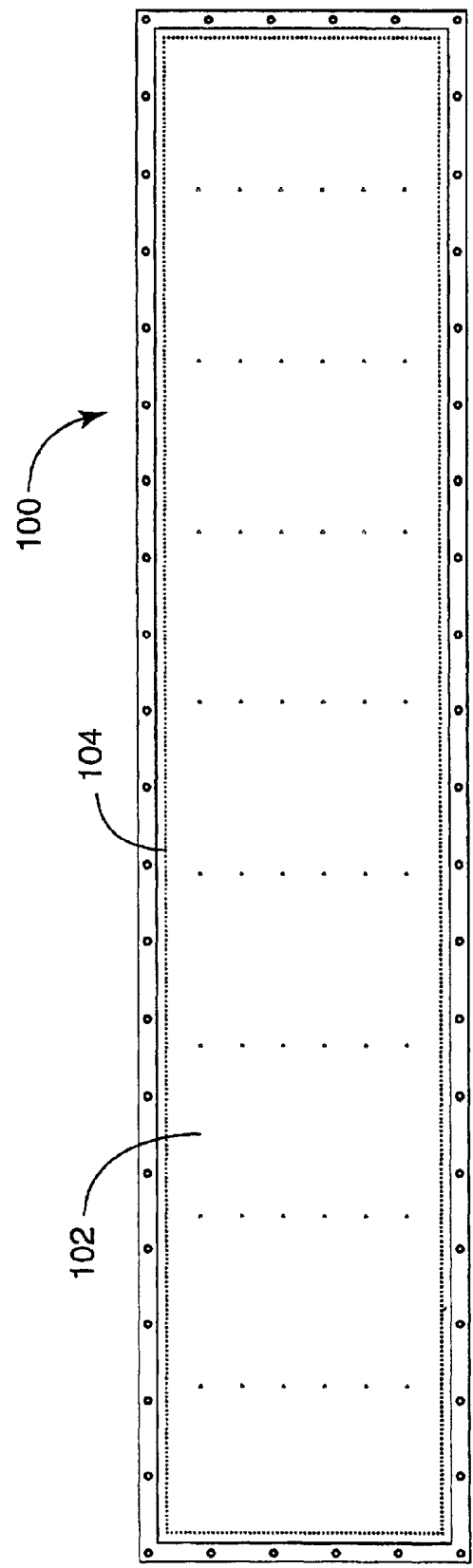
FIG. 6A is a top view of a vacuum fixture.

Therefore, a special customized vacuum fixture assembly (or vacuum fixture) 100, as illustrated in FIGS. 6, 6A and 6B is utilized in the grinding process. Typically, the vacuum fixture assembly 100 is large enough to make a shim for an extrusion die up to about 30 inches (762 mm) in length. In one embodiment, the vacuum fixture 100 is approximately 84 inches (2.1 m) in length and 18 inches (46 cm) in width, although other sizes can be used without departing from the scope of the invention. A top surface 102 of vacuum fixture assembly 100 is the mounting surface for the shim material 92. Vacuum channels 104 are disposed through top surface 102. A vacuum is introduced onto the vacuum fixture assembly 100 which causes sub-ambient pressure through vacuum channels 104. The vacuum fixture 100 is preferably a magnetic material such as steel, so that it can be held down to a typical magnetic surface grinder chuck. It should be noted that there are typically many more vacuum channels 104 in top surface 102 of vacuum fixture assembly 100 than is illustrated in FIGS. 6 and 6A. For clarity, the number of vacuum channels 104 illustrated has been limited.

The vacuum fixture 100 is made to a very high level of stiffness, so that it does not deflect due to the forces of grinding or the applied vacuum. Deflection of the vacuum fixture 100 can result in variation in the shim thickness. The vacuum fixture 100 is designed to provide sufficient vacuum to hold the shim material in place. If the shim comes loose, it (or the grinder equipment) can be damaged and additionally can be a safety hazard to the grinder operator.

The vacuum fixture 100 is mounted on a surface grinder chuck 101 and a magnetic field is applied which secures the vacuum fixture assembly 100 to the magnetic chuck 101. A top surface 102 of the vacuum assembly fixture is ground flat, preferably to the attainable tolerance of the precision grinder. Shim material 92 (shown in dotted lines in FIG. 6B) is mounted on the top surface 102 of the vacuum fixture assembly 100 by applying a vacuum to the vacuum fixture assembly 100. The vacuum causes sub-ambient pressure in vacuum channels 104 and a downward force on shim material 92 which holds the shim material 92 in place. The first surface 90 of shim material 92 is ground using the precision grinder. The vacuum is then removed from the vacuum fixture assembly 100 so that the shim material 92 can be flipped. The recently ground first surface 90 is placed against the top surface 102 of the vacuum fixture assembly 100. The second surface 96 of the shim material 92 is then accessible to the precision grinder. The vacuum is reapplied to the vacuum fixture assembly 100 and the second surface 96 is ground. Grinding and flipping is continued until the shim material 106 is at the desired thickness. Note that the top surface 102 of the vacuum fixture assembly 100 is preferably re-ground each time the fixture is used to ensure minimum TIR of the fixture surface, which directly translates to the ultimate uniformity of the shim material 92.

Additionally, by varying the shape of the top surface 102 of the vacuum fixture 100 it may be possible to affect the range at which the precision grinder can vary the thickness of the profiled shim 92A (previously discussed with respect to FIG. 5B).

Increasing the grinder capability correspondingly allows the ultimate final TIR on the shim material 92 to be lowered. The final shim (such as shim 84 illustrated in FIG. 4) is then cut from the now specially ground shim material 92 in a way that minimizes any additional distortion to the shim. Laser cutting the shim material 92 is preferred. Additionally, no deburring operations are utilized that could reduce flatness of the shim 84. Waterjet cutting, EDM (electrical discharge machining) wire cutting techniques, milling operations or shearing operations may alternatively also be utilized. Equipment available for waterjet cutting is available from Flow International Corporation, Kent, Wash. As mentioned, the final shape of the shim 84 may be cut before or after grinding the shim material by the precision grinder, if an appropriate fixture for holding the final shaped film is utilized. In one embodiment, the shim material is sandwiched between layers of a sacrificial support material such as steel while cutting with a waterjet to minimize burr formation.

Sometimes for thick shim material 92 (about 20 mil (508 microns) or more) or additionally when larger amounts (1–2 mil (25–51 microns)) of material is being removed by the grinder, the shim material 92 can release from the fixture resulting in damage to the shim material 92. This release may be caused by the work done on the shim material 92 in combination with the internal stiffness of the shim material 92 and/or internal stresses built up on the shim material 92 which break the vacuum seal between the shim material 92 and the vacuum fixture assembly 100.

In one embodiment, extra precautions can be taken to seal the shim material 92 in the vacuum assembly 100. Adhesive material is placed around the shim material perimeter as illustrated in FIG. 6B. For example, the vacuum fixture 100 can be "picture framed" with high performance double stick tape 112. The tape 112 provides not only extra adhesion at the edges of the shim material 92, but also acts as a vacuum seal at the edge of the shim material 92. The tape 112 has a finite thickness, so a recess 114 is provided on the vacuum fixture assembly 100. The area of the shim material 92 in contact with the tape 112 can be ultimately scrapped in the laser cutting process, if necessary.

Tape 112 is applied to the vacuum fixture assembly 100 in the recess 114. Preferably, the vacuum fixture assembly 100 is cleaned to encourage adhesion. The tape 112 is trimmed to the recess 114 width with a razor blade (not shown). Any liner present on the tape 112 is removed from the exposed side of the tape 112. The shim material 92 is put on the vacuum fixture assembly 100. A vacuum is applied, and the shim material 92 is pressed onto the tape 112 to ensure good adhesion. The shim material 92 is ground, as described previously. The vacuum is removed and the shim material 92 is detached from the vacuum fixture assembly 100. Heat may be used to help release the shim material 92 (e.g., by using a heat gun). The shim material 92 can then be flipped and the process repeated for the other side of the shim material 106 (as previously described). The shim material 106 is then cut to its final shape, as described earlier (by laser, water-jet, etc.).

One preferable tape 112 for vacuum fixture assembly 100 is 3M Flexomount™ Plate Mounting Tape, #411 (gray tape) manufactured by 3M, St. Paul, Minn. The tape 112 is designed for mounting photopolymer and rubber printing plates to flexographic printing cylinders. It is available in standard widths from ½ inch (12.7 mm), ¾ inch (19 mm), 1 inch (25.4 mm), 2 inches (51 mm) and up to about 18 inches (45.7 mm). The tape is 0.015 inches (0.381 mm) thick and not very compressible. Other bonding materials could be used in place of the Flexomount tape without departing from the spirit and scope of this invention (e.g. putty).

Another improvement in holding down the shim material 92 for grinding is to use a magnetic hold down force in addition to the vacuum force described above. This can be accomplished by adhering a layer of magnetic plastic material such as Plastiform™ or Plastimag™ material available in sheets from Group Arnold, Norfolk, NB, on the surface of the vacuum fixture 100. Holes are cut through the Plastiform material corresponding to the vacuum channels (or holes) 104 in the vacuum fixture 100 so both vacuum and magnetic forces can assist in holding down the shim material. In this embodiment, a magnetic shim material is used such as a magnetic stainless steel (e.g., 400 series, 15-5 or 17-4) or plated nickel sheet.

The size and shape of the vacuum channels 104 in the vacuum fixture assembly 100 need to be chosen carefully. Channels 104 which are too small (or too few channels) will limit the vacuum hold down force. Channels 104 which are too large will result in deflection of the shim material 92 in the unsupported area over the vacuum channels 104 due to the vacuum forces and forces of the machining operation itself. Large vacuum channels 104 can be used with thicker shim material 92 because the strength of the thicker sheet resists deflection. Based on numerical analysis of deflection for a $\frac{1}{16}$ inch (1.5 mm) diameter hole, 0.005 inch (0.127 mm) thick stainless steel sheet would be expected to deflect 1 to 5 microinches (0.03–0.1 microns) under the vacuum force, while 0.010 inch thick stainless steel sheet is expected to deflect only about 0.2 to 0.7 microinches (50–200 angstroms). The exemplary vacuum fixture assembly 100 shown in FIG. 6A uses $\frac{1}{16}$ inch (1.6 mm) holes spaced in a 0.25 inch (6.4 mm) rectangular grid. To improve the airflow for better vacuum hold-down performance, the holes can be counterbored to a larger diameter (such as $\frac{1}{8}$ inch (3.2 mm)) from the backside of the plate forming the top surface 102 of the vacuum fixture assembly 100. In this example, a 1.0 inch (25 mm) thick top plate of the vacuum fixture is utilized, with a $\frac{1}{8}$ inch (3.2 mm) counter bore of 0.75 (19.7 mm) inch from the back side of the plate, leaving only 0.25 inch (6.4 mm) depth of the $\frac{1}{16}$ inch (1.6 mm) holes near the plate surface.

Figure 7:
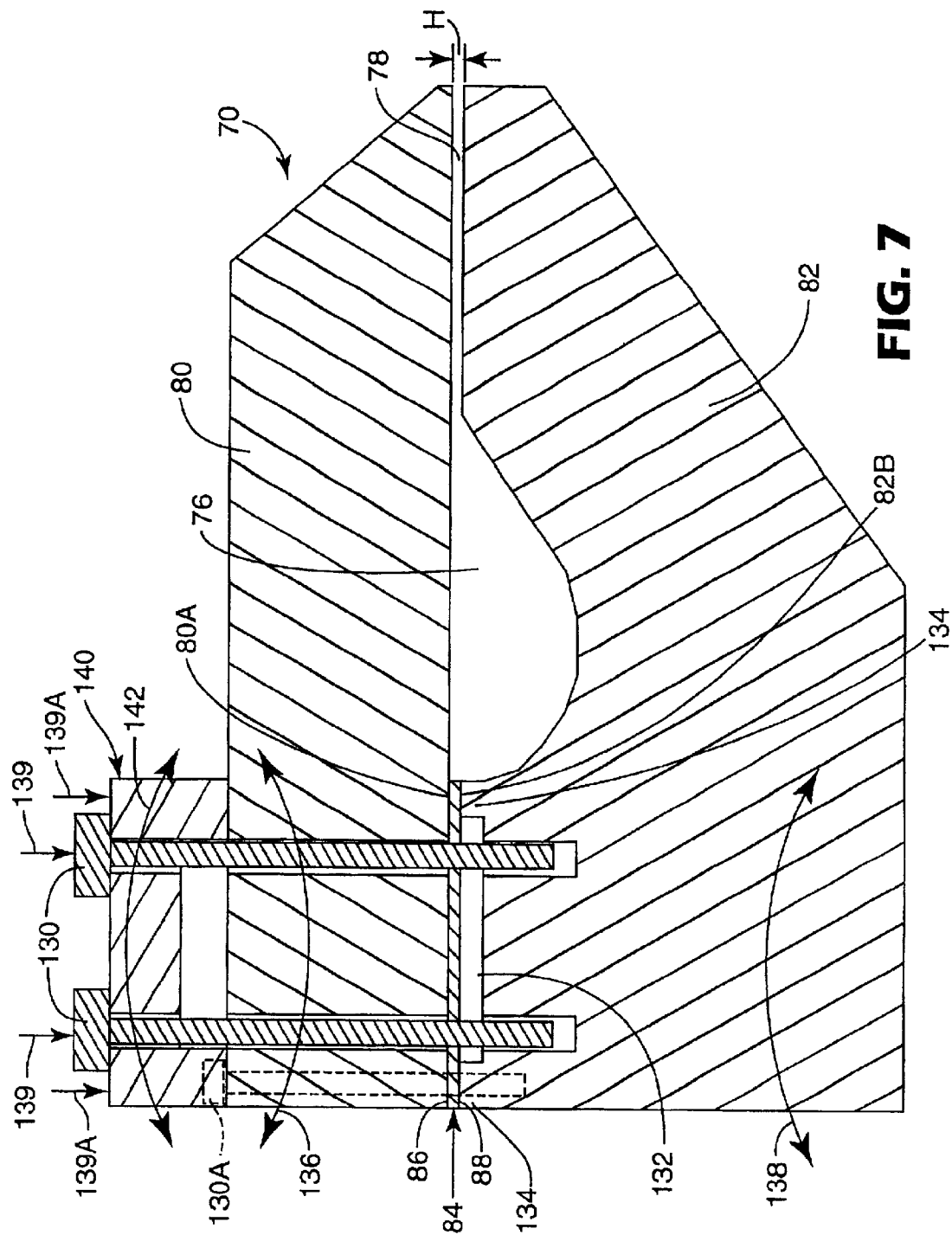
FIG. 7 is a cross-sectional view of the coating die of FIG. 3, with braces attached.

Many extrusion type dies (such as extrusion coating die 70 illustrated in FIG. 3) can have a slot variation which is the result of the physical connection between the die top portion 80 and the die bottom 82 portion. As shown in FIG. 7, to overcome bending of the die coater 70 due to assembly forces, the inventive method additionally can involve designing the slot coater die parts to minimize the deflection of the die portions under the forces of assembly. The forces of assembly are usually provided by a pattern of bolts (or fasteners) 130. An exemplary pattern is illustrated in FIG. 4 by holes 62, 62A and 62B in shim 84. A recess (or relief) 132 is disposed in the bottom portion 82 of the die 70 and is a typical feature of production type coater dies. This recess 132 is typically provided to form narrow lands (or standoffs) 134 which engage the top portion 80 of the die 70. At least one bolt 130 typically extends through the top die portion 80, through the recess 132 and into the bottom die portion 82 (two bolts 130 are illustrated in FIG. 7). The bolts 130 are typically threaded in the bottom die portion 82, although other securing means are known, such as extending the bolts 130 completely through the bottom die portion 82 (discussed further with respect to FIG. 8). The bolts 130 are then torqued to an appropriate level to withstand the hydrodynamic pressure of liquid flowing through the die manifold cavity and slot 78. Previously, torqueing the fasteners would result in a "bowing" of the top die portion 80, in a manner indicated by arrow 136. The bottom die portion 82 was also "bowed" in a manner indicated by arrow 138. Clamping force vectors 139 extended along the fasteners 130, and therefore extended through recess 132, causing the "bowing" to occur. This bending or bowing of the top portion 80 and bottom portion 82 had the effect of causing variations to the slot space 78 height "H", which affected the desired constant cross-sectional thickness of the material flowing through the slot 78. It should be noted that while two fasteners 130 are illustrated and while recess 132 is disposed in the bottom portion 82 of die 70 any number of die configurations, including any number of fasteners or alternate positioning of recess are contemplated.

In one embodiment, the effect of the deflection of die coater 70 (as shown by arrows 136 and 138) under bolt torque is substantially improved by the addition of at least one brace 140 on the bolts over the recess 132. These braces 140 distribute the clamping force 139A from the bolts 130 directly over the land areas 134. In this way, the brace 140 experiences any bending distortion (as illustrated by arrow 142) instead of the top portion 80 of die 70. An alternate embodiment of the invention would remove fasteners 130 from recess 132 and instead dispose fasteners 130A (indicated by dotted lines) such that they extend through the land areas 134, eliminating the need for brace 140.

Figure 8:
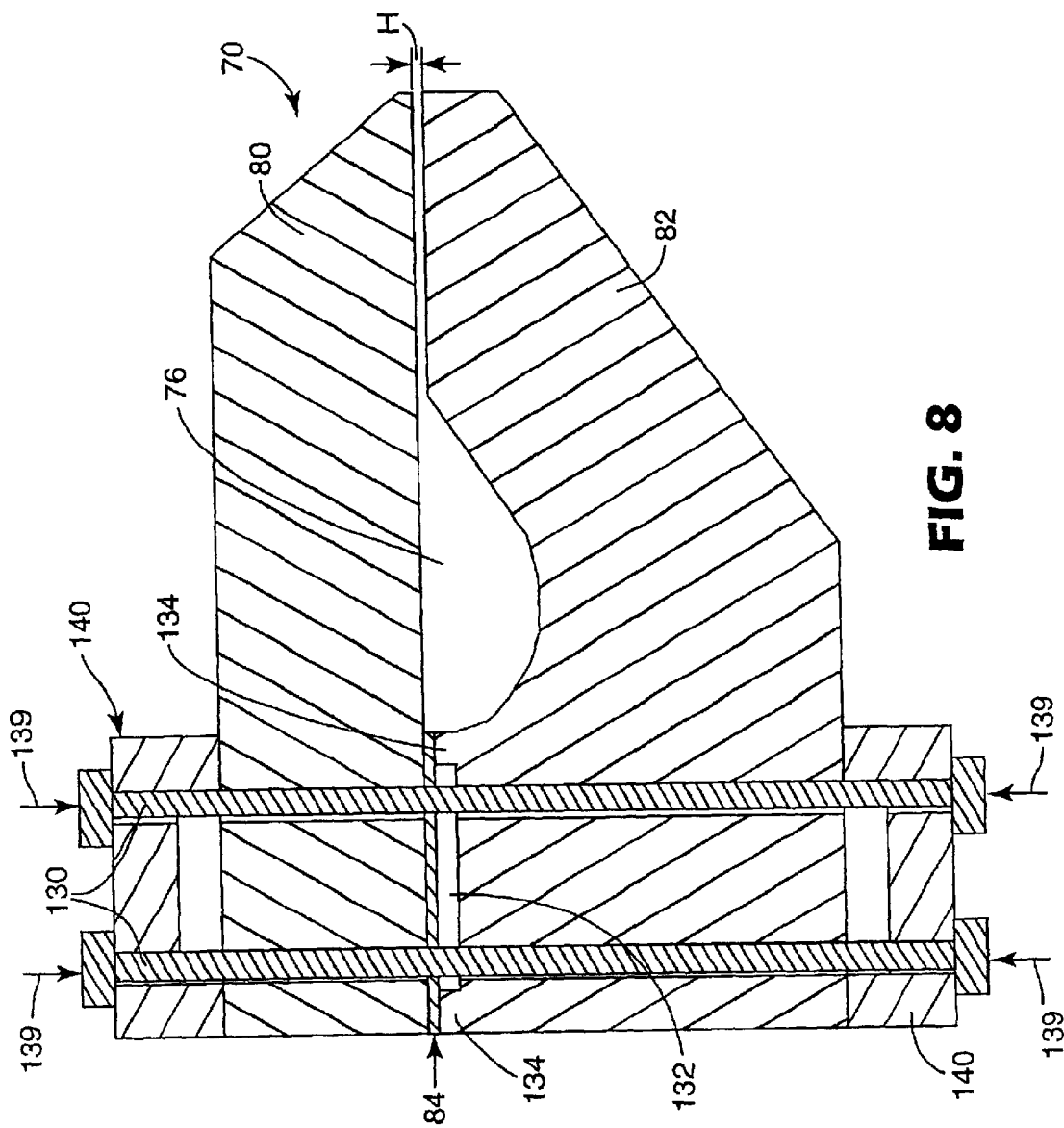
FIG. 8 is an alternate cross-sectional view of the coating die of FIG. 3 with braces attached.

A further embodiment of the invention is illustrated in FIG. 8. Here, the fasteners 130 extend completely through top portion 80 and bottom portion 82 of die 70. Braces 140 are used to transfer the clamping force 139 provided by the fasteners 130 on both the top die portion 80 and bottom die portion 82 through land areas 134. Thus, the braces 140 act to minimize deflection of both die top 80 and die bottom 82.

Figure 9:
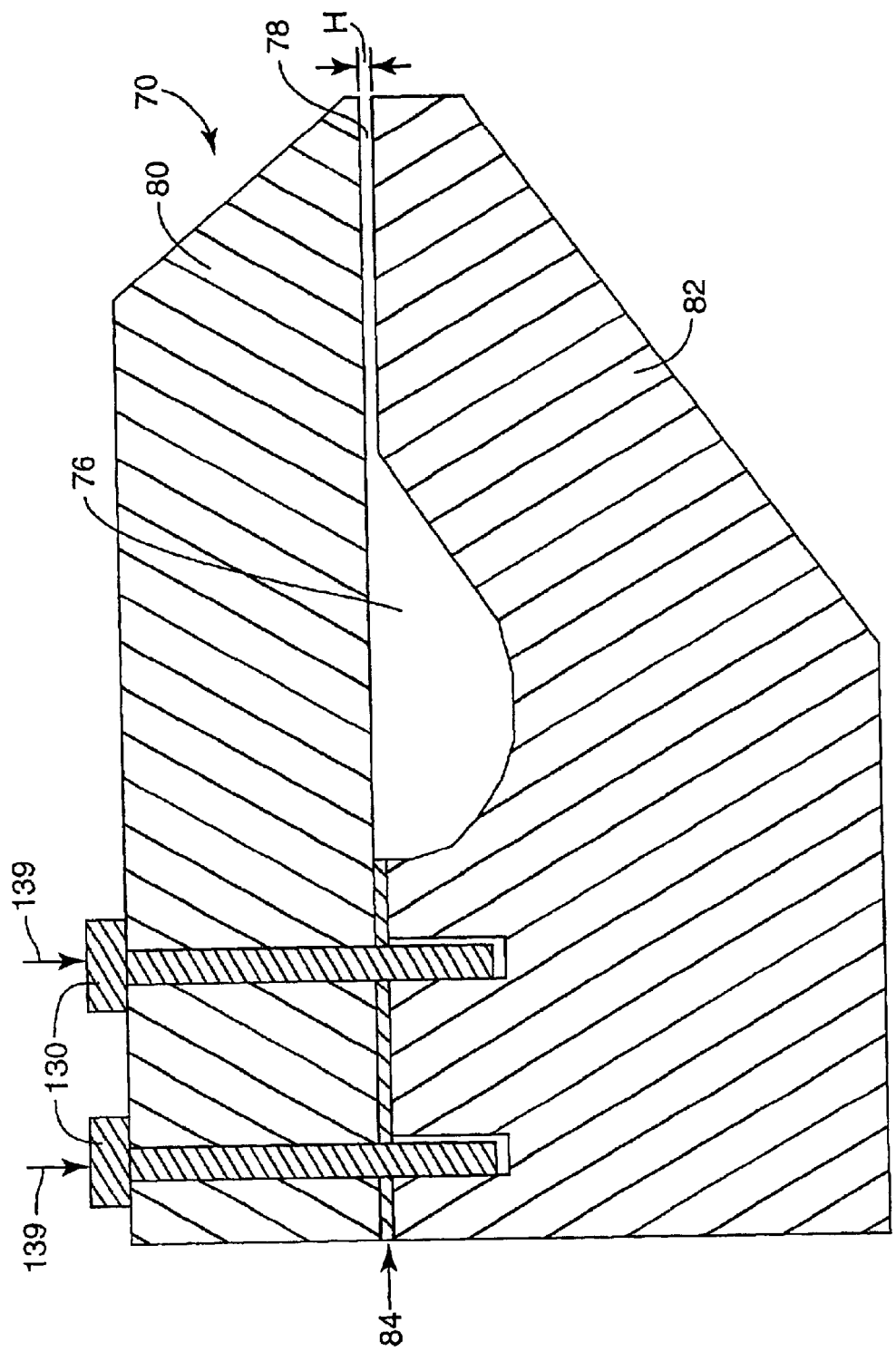
FIG. 9 is an alternate cross-sectional view of the coating die of FIG. 3.

A further embodiment of this invention is to fabricate die portions 80 and 82 without the traditional recess in either top portion 80 or bottom portion 82 as illustrated in FIG. 9. Therefore, if top portion 80 and bottom portion 82 are ground flat without a recess, no deflection occurs. Any remaining minimal deflection can be reduced further by decreasing the distance between fasteners and the size of the fasteners to assemble the die 130.

Figure 10:
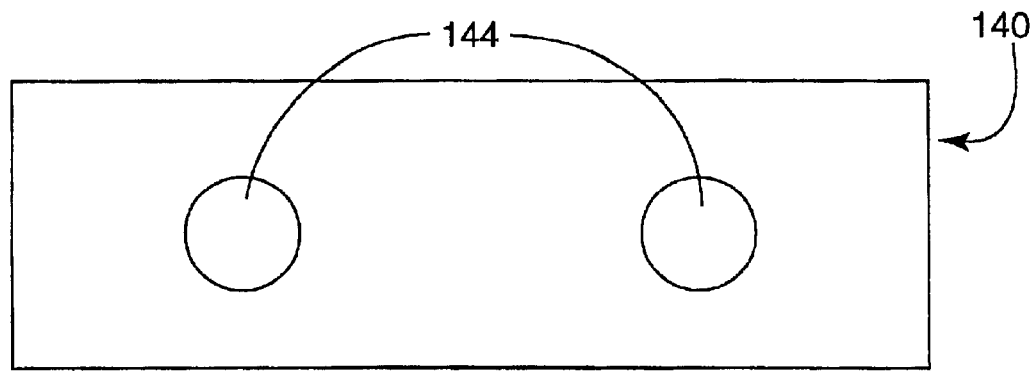
FIG. 10 is a top view of an exemplary brace.
Figure 11:
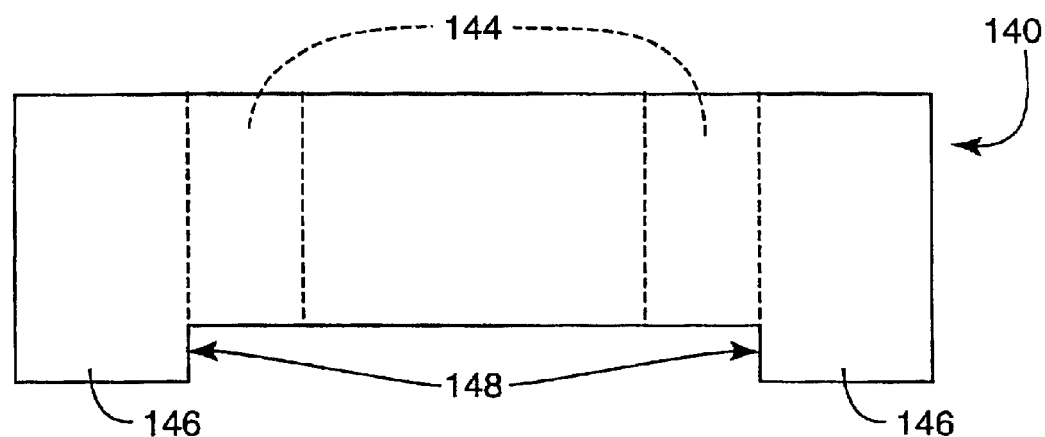
FIG. 11 is a side view of an exemplary brace.

Distributing the clamping forces 139 away from the recess 132 of the die 70 in any of the embodiments described with respect to FIGS. 7–9 is a significant improvement over the standard methods of design, the clamping fabrication and use of slot type coating dies. It allows a significant improvement in crossweb uniformity. An exemplary brace 140 which may be used in the inventive design is illustrated in FIGS. 10 and 11. The exemplary brace 140 is shown in a top view in FIG. 10 and a side view in FIG. 11. Fastener holes 144 extend through brace 140 and allow fasteners 130 to extend through and into die 70. Legs 146 engage die 70. Since a space 148 is disposed between the legs 146, the bracket 140 will bend while the legs 146 transfer the clamping force to the die coater 70.

EXAMPLES

Example 1

The resultant improvement in the uniformity of the slot and coating crossweb uniformity due to the addition of the braces and the improved shim was illustrated by measuring the die slot in an extrusion die coater before and after the die improvements were made. The die slot was measured using a special capacitance probe system from Capacitec, Inc., Ayer, Mass. The system included a 4004-P115-OBNC Equipment Rack, 4 Channel capable, with power supply, a 4100-CM3-4.5LED Clock/Display Module, a GPD-2G-A-150-FX90-5509-5961 Custom Wand (0.009 nominal thickness), a Custom GPD wand holder, Custom Bargrafx Software, a Model 700PC16/12 Data Acquisition Card, and a Notebook PC Computer with Windows 95 or 98.

The repeatability of the slot measurement with the Capacitec probe was determined by inserting the probe at a specific point into the die slot, measuring, and removing the probe. This was repeated for 15 measurements. Statistical analysis of the measurements determined that the repeatability of the probe measurements was within about ±0.0025 mil (0.064 micron).

An extrusion die 70, as was described with respect to FIG. 7 was used. The aligning surfaces 80A and 82B of top and bottom portions 80 and 82 of die 70 were ground flat to a free-state flatness of about 25–30 microinch (0.64–0.76 microns) on a Waldrich-Coberg grinder (discussed above). The slot uniformity of the die 70 was improved by using braces 140 over all bolts 130 to minimize die deflection. The shim 84 was installed and the die assembled using a torque wrench. The slot 78 was 27 inches (684 mm) wide.

The measurement results indicated that with the optimized bracing set-up and a standard off the shelf shim, the most uniform slot possible had a 128 microinch (3.25 micron) TIR for the slot 78. For a Newtonian fluid, this translates into a minimum expected 3.8% crossweb variation in coating thickness, using the formula discussed previously with respect to FIG. 5. By comparison, an improved shim of the current invention was installed. The shim was 10 mils (254 microns) thick and ground to TIR less than 50 microinches (1.2 microns), using an Elb-Schliff grinder (discussed above). Using the improved shim of the invention, in combination with the improved bracing, the slot variation was reduced to about 51 microinch (1.3 microns) which corresponds to an expected crossweb coating weight variation of 1.5%. By adjusting the torque on bolts desposed through the die at the positions indicated by first and second slot holes 62A and 62B in FIG. 4, TIR was reduced further to about 24 microinch (0.61 micron) and the expected crossweb coating variation was 0.7%. Adjusting the end bolts 130 disposed through first and second slot holes 62A and 62B compensated for the bowing of the bottom die portion 82, i.e. line 138 in FIG. 7.

Figure 12:
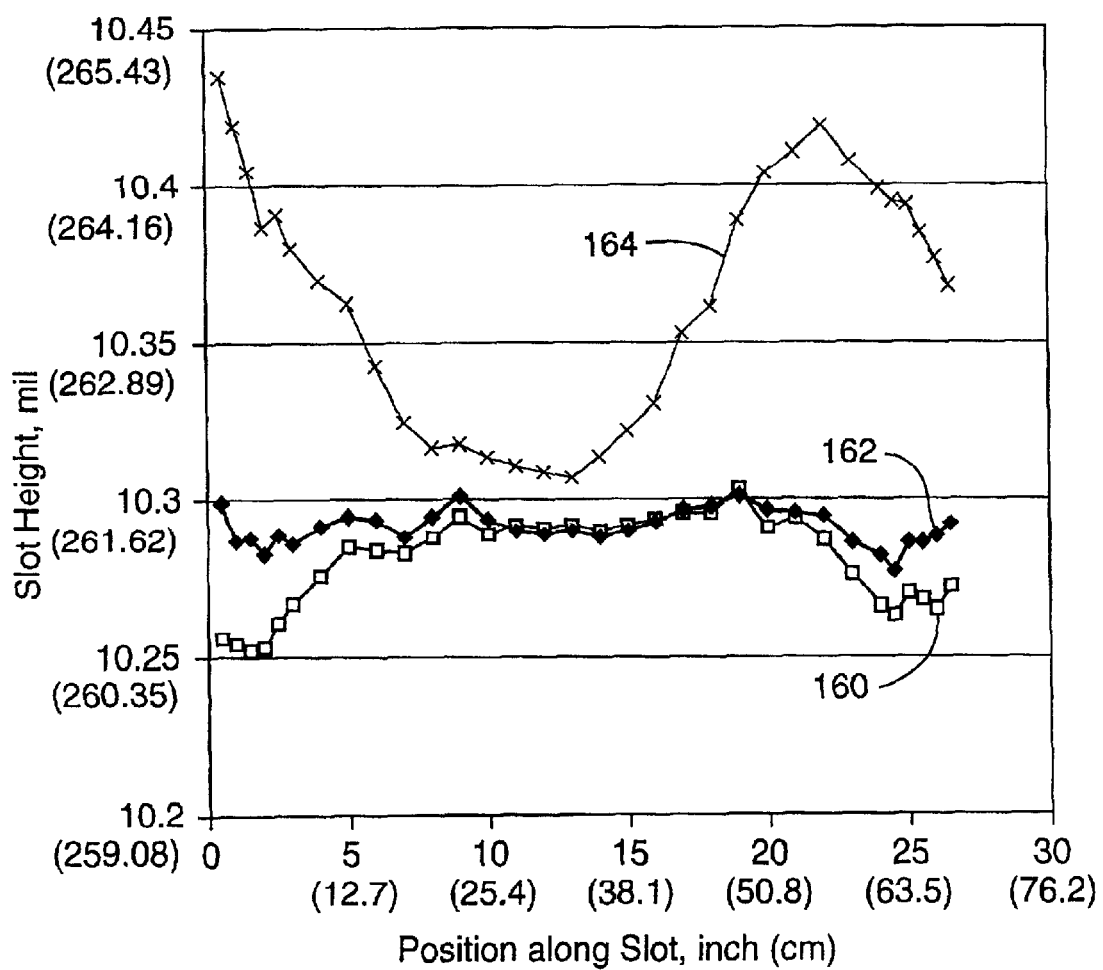
FIG. 12 is a graph illustrating the effect of the inventive method on slot uniformity.

These results are illustrated in FIG. 12. For measurement trial one (reference number 160) the improved shim 84 was used, braces 140 were attached to the die 70, and the die fasteners 130 were torqued to about 20 ft.-lbs. (27 Nm). As illustrated by the measurements of the slot heights from one end of the slot width to the other end of the slot width, the variation of the slot height was minimal. Measurement trial two (reference number 162) utilized an improved shim 84 with braces 140 attached to the die 70, and the die fasteners 130 were torqued to about 20 ft-lbs (27 Nm). Bolts extending through first and second slot holes 62A and 62B were used to optimize the slot, providing even less variation in slot height. Measurement trial three (reference number 164) utilized a standard shim (not precisely ground) with braces 140 attached to the die 70, and the die fasteners were torqued to about 20 ft-lbs. (27 Nm). As can be seen from FIG. 12, the result was a wide range in slot height across the width of the slot.

Example 2

A second set of trials was done to verify the improvement of die performance due to the inventive die assembly method. Again, the die set-up is similar to the extrusion die illustrated in FIG. 7. The die alignment surfaces 80A and 82B were ground flat to a free-state flatness of about 25–30 microinch on a Waldrich-Coberg grinder. The special ground shim 84 (i.e. The shim was 10 mils (254 microns) thick and ground to TIR less than 50 microinches (1.2 microns) was used to minimize the slot variation from the shim itself.

Figure 13:
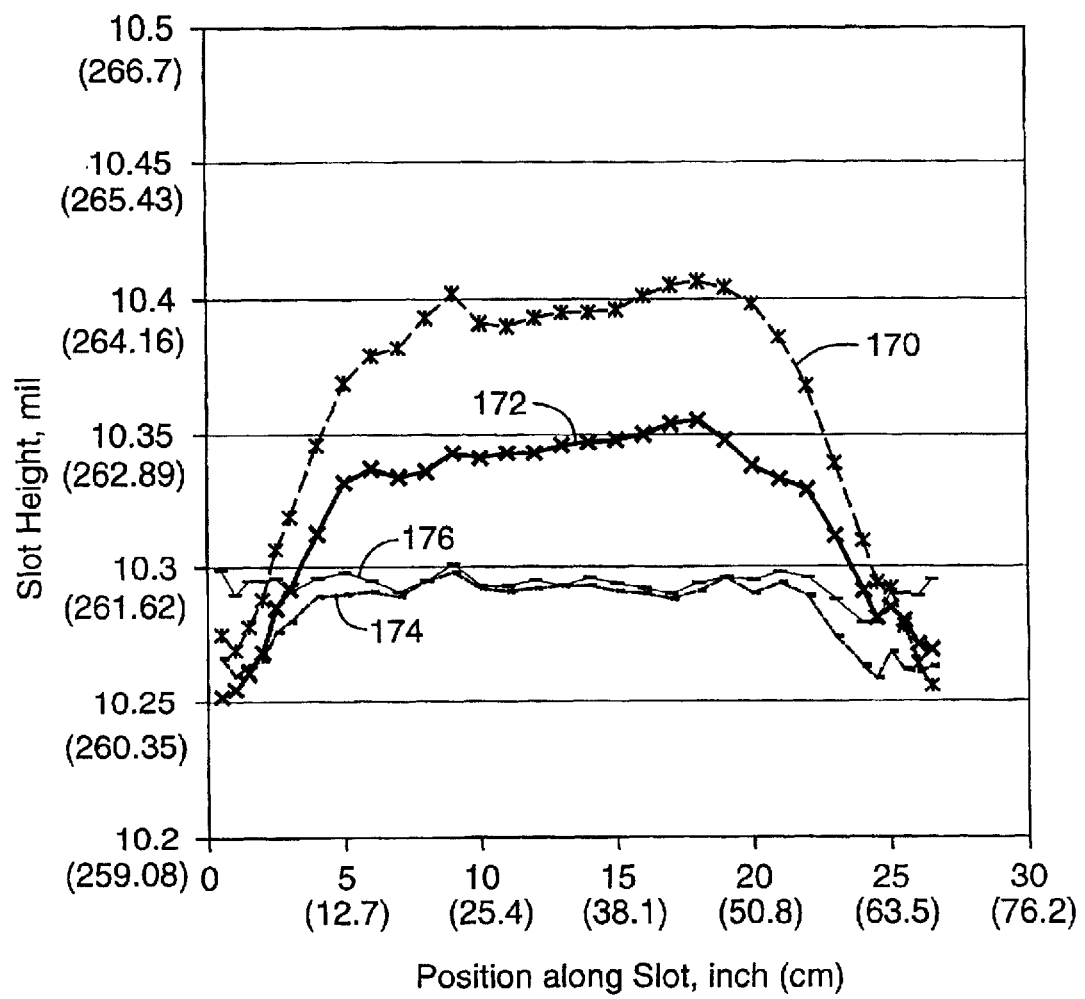
FIG. 13 is a graph illustrating the effect of the inventive method on slot uniformity.

Curve 170 on FIG. 13 displays the slot height measurements without braces 140 and with the bolt fasteners 130 torqued to 40 ft-lbs. (27 Nm). The second curve 172 displays the slot height measurements without braces 140 and with the fasteners 130 torqued to 20 ft-lbs. (27 Nm). The severity of the top portion 80 and bottom portion 82 deflections apparently increases with torque level. The TIR of the slot 78 increased from 103 microinch (2.62 microns) at 20 ft-lbs. (27 Nm) to about 150 microinch (3.81 microns) at 40 ft-lbs. (54 Nm) torque. Curve 174 represents the slot measurements with 20 ft-lbs. (27 Nm) on all fasteners 130 but utilizing the braces 140 to distribute the clamping force 139 onto the land areas 134 of the bottom portion 80 of the die 70. The frown profile of the slot height is now reduced to about 39 microinch (0.99 microns). The remainder of the frown is consistent with the remaining deflection of the bottom die portion 82, which does not appear to be reduced by the braces on the top die portion 80. Curve 162 (as described with respect to FIG. 12) is repeated in FIG. 13 to compare the fully optimized slot 78 to the curves 170, 172, and 174. To verify the relationship between the uniform die slot and the uniform flow cross-section of the extrudate, a Newtonian polymer solution with a viscosity of around 10 cps was coated on a web using the optimized die 70 (see curve 162) at the following parameters:

75 fpm web speed (0.38 m/s)

250 g/min flow rate of extrudate 0.007 inch coating gap (0.178 mm)

0.004 inch (0.102 mm) thick×28 inch (0.71 mm) wide polyester film

18% by weight solids in coating material

Figure 14:
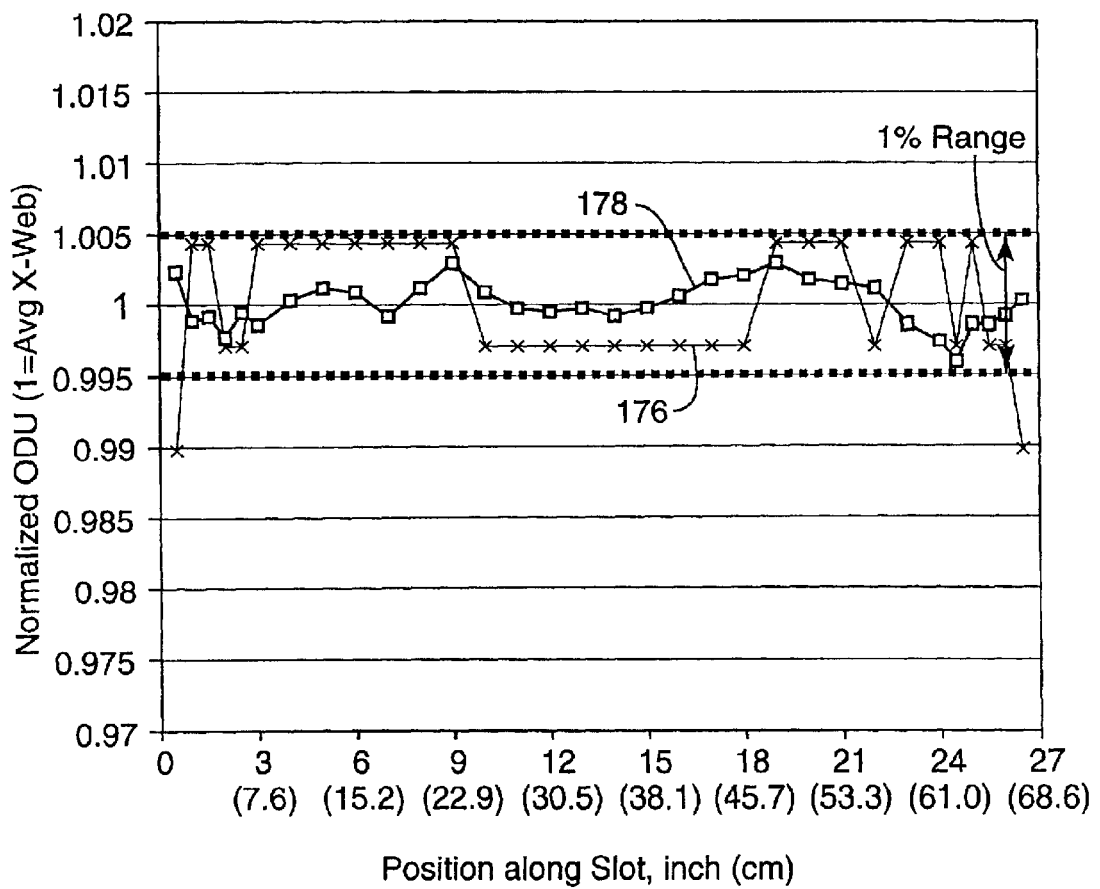
FIG. 14 is a graph illustrating the effect of the inventive method on uniformity of flow.

A comparison between the measured variation in slot height indicated by reference number 178, and optical density measurement (ODU), using an optical densitometer such as those manufactured by Gretag-MacBeth, New Windsor, N.Y. of the extrudate cross-section indicated by reference number 176, is shown in FIG. 14. Optical density measurements were taken every 0.5 inch (12.7 mm) of width within 3 inches (76.2 mm) of the edges of the web. These measurement points were then normalized, resulting in curve 176. Curve 176 was then compared to curve 178. Curve 178 was obtained by normalizing the cube of curve 162 (as described in FIGS. 12 and 13). Normalizing this data allows the variation of curve 176 to be easily compared to curve 178. Notice that under ideal circumstances (Newtonian liquid, no temperature variations, no fluid disturbances, etc.), the best achievable uniformity for this sample should be 0.7%. Other than the first and the last points measured on curve 178, the crossweb uniformity of the coated sample is 0.9%. Please note that this uniformity corresponds to plus or minus 0.01 micron (average thickness was 2.48 micron) and is calculated based on the range of the data and not the standard deviation. For the liquid of the examples, the best crossweb uniformity prior to this inventive extrusion method was >7% with a "smile" coating profile, (i.e., where the coating was thicker at the edges and thinner in the middle). Thus, the inventive method improved slot uniformity from over about 200 microinches (5.1 microns) to less than about 25 microinches (0.64 microns).

Results of Examples

The results prove that the recess machined into the extrusion die body along with shim variations are large negative contributors to the non-uniformity of the die slot height. The braces 140 on the fasteners 130 bridge the recess 114 and redirect the clamping force over the lands 134 of the die body, thus eliminating the inherent distortion of the die top. The improved shim 84 reduces slot runout due to variations in thickness of the shim. By utilizing these die assembly methods, crossweb variations of extrudate can be greatly reduced.

Although the present invention has been described with reference to preferred embodiments, workers skilled in the art will recognize that changes may be made in form and detail without departing from the spirit and scope of the invention. All publications and patents referenced in the application are incorporated by reference in their entirely herein. All percentages of materials are by weight, unless otherwise indicated.

What is claimed is:

1. A method for forming extrudate having substantially uniform thickness comprising:

forming a shim with a thickness variation of less than about 5 percent for a shim having an average thickness of about 30 mil (762 microns) or less;

disposing the shim between a first die portion having a first surface and a second die portion having a second surface, so as to form a slot between the first surface and the second surface, the slot having a height dimension substantially the same as the shim thickness; and extruding flowable material through the slot.

2. The method of claim 1 wherein the height of the slot has a variation in height of about 1 percent or less along the width of the slot.

3. The method of claim 1 wherein the first die surface and the second die surface are machined to improve the tolerance of the height of the slot.

4. The method of claim 1 wherein the step of forming the shim comprises:

securing a vacuum box assembly to a grinder chuck;

grinding a top surface of the vacuum box assembly;

disposing the shim on a vacuum box assembly;

applying a vacuum between the shim and the top surface of the vacuum box assembly so as to fix the shim stock on the top surface; and grinding a first surface of the shim with a grinder.

5. The method of claim 4 further comprising grinding a second surface of the shim.

6. The method of claim 4 wherein the grinder is capable of less than 80 microinch runout over an 80 inch length.

7. The method of claim 4, and further comprising:
    disposing an adhesive material in a groove in the top surface so as to engage the top surface and the shim.

8. The method of claim 4 and further comprising:
    cutting the shim, wherein the method of cutting the shim is selected from the group consisting of laser cutting, water jet cutting and EDM wire cutting.

9. The method of claim 8 wherein the step of cutting the shim occurs after the step of grinding the shim.

10. The method of claim 4 wherein the shim material is selected from the group consisting of plated nickel sheet material, brass, stainless steel, magnetic stainless steel.

11. The method of claim 4 wherein the shim material is comprised of a machinable metal.

12. The method of claim 1, and further comprising:
    disposing standoffs between the first die portion and the second die portion so as to form a recess between the first die portion and the second die portion;
    extending a fastener through the recess;
    providing a clamping force between the first die portion and the second die portion utilizing the fastener;
    supportably engaging the fastener with a first bracket;
    distributing at least a portion of the clamping force of the fastener through the first bracket; and
    minimizing the bending of the first die portion.

13. The method of claim 12 and further comprising:
    supportably engaging the fastener with a second bracket disposed against the second die portion;
    wherein the first bracket is disposed against the first die portion; and
    distributing substantially all of the clamping force of the fastener such that the clamping force acts through the first die portion and the second die portion through areas other than the recess.

14. The method of claim 1 and further comprising:
    disposing standoffs between the first die portion and the second die portion so as to form a recess between the first die portion and the second die portion;
    extending a fastener between the first die portion and the second die portion such that the fastener does not extend through the recess; and
    utilizing the fastener to provide a clamping force between the top die portion and the bottom die portion.

15. The method of claim 4 and further comprising:
    disposing a layer of magnetic plastic material on the top surface of the vacuum box assembly.

* * * * *

UNITED STATES PATENT AND TRADEMARK OFFICE
CERTIFICATE OF CORRECTION

PATENT NO.    : 6,813,820 B2
DATED         : November 9, 2004
INVENTOR(S)   : Nelson, James M.

It is certified that error appears in the above-identified patent and that said Letters Patent is hereby corrected as shown below:

Column 4,
Line 34, delete "criteria" and insert -- criterion --.

Column 10,
Line 51, delete "8.5 mu" and insert -- 8.5 mil --.

Column 16,
Line 48, delete "desposed" and insert -- disposed --.

Signed and Sealed this

Twelfth Day of July, 2005

JON W. DUDAS
*Director of the United States Patent and Trademark Office*